United States Patent
Birrell et al.

(10) Patent No.: US 8,025,542 B2
(45) Date of Patent: Sep. 27, 2011

(54) METHOD OF PERFORMING AN OPERATION WITH RHEOLOGICAL COMPOUND

(75) Inventors: Steven Edward Birrell, Bozeman, MT (US); Alan Cable, San Jose, CA (US); Joel Visser, Manhattan, MT (US); Lydia J. Young, Palo Alto, CA (US); Justin Kwak, Mountain View, CA (US); Joachim Eldring, Bozeman, MT (US); Thomas H. Bailey, San Jose, CA (US); Alberto Pique, Crofton, MD (US); Raymond Auyeung, Alexandria, VA (US)

(73) Assignees: Photon Dynamics, Inc., San Jose, CA (US); The United States of America as represented by the Secretary of the Navy, Arlington, VA (US)

( * ) Notice: Subject to any disclaimer, the term of this patent is extended or adjusted under 35 U.S.C. 154(b) by 1169 days.

(21) Appl. No.: 11/748,281

(22) Filed: May 14, 2007

(65) Prior Publication Data
US 2008/0139075 A1    Jun. 12, 2008

Related U.S. Application Data

(60) Provisional application No. 60/747,158, filed on May 12, 2006.

(51) Int. Cl.
*H01J 9/24* (2006.01)
(52) U.S. Cl. .................................................... 445/24
(58) Field of Classification Search ............... 445/61, 445/24
See application file for complete search history.

(56) References Cited

U.S. PATENT DOCUMENTS

| 4,588,674 A | * | 5/1986 | Stewart et al. ............ 430/273.1 |
| 4,752,455 A | | 6/1988 | Mayer |
| 4,801,352 A | | 1/1989 | Piwczyk |
| 4,880,959 A | | 11/1989 | Baum et al. |
| 4,970,196 A | | 11/1990 | Kim et al. |

(Continued)

FOREIGN PATENT DOCUMENTS

TW        200804942 A    1/2008

(Continued)

OTHER PUBLICATIONS

Non-Final Office Action for U.S. Appl. No. 11/970,495, mailed on Apr. 22, 2010, 16 pages.

(Continued)

*Primary Examiner* — Toan Ton
*Assistant Examiner* — Hana Featherly
(74) *Attorney, Agent, or Firm* — Kilpatrick Townsend & Stockton LLP; Ardeshir Tabibi

(57) ABSTRACT

An apparatus includes integrated review, material removal and material deposition functions. The apparatus performs the review, material removal and material deposition operations along the same optical axis. The apparatus includes, in part, a camera, a pair of lenses, and one or more lasers. A first lens is used to focus the camera along the optical axis on a structure formed on the target substrate undergoing review. The first lens is also used to focus the laser beam on the structure to remove a material present thereon if the reviewed structure is identified as requiring material removal. The second lens is used to focus the laser beam on a ribbon to transfer a rheological compound from a recessed well formed in the ribbon to the structure if the reviewed structure is identified as requiring material deposition.

29 Claims, 16 Drawing Sheets

U.S. PATENT DOCUMENTS

| | | | |
|---|---|---|---|
| 4,987,006 | A | 1/1991 | Williams et al. |
| 5,164,565 | A | 11/1992 | Addiego et al. |
| 5,246,885 | A | 9/1993 | Braren et al. |
| 6,060,127 | A | 5/2000 | Tatah et al. |
| 6,159,832 | A | 12/2000 | Mayer |
| 6,177,151 | B1 | 1/2001 | Chrisey et al. |
| 6,441,943 | B1 | 8/2002 | Roberts et al. |
| 6,583,318 | B2 | 6/2003 | Campian et al. |
| 6,649,861 | B2 | 11/2003 | Duignan |
| 6,660,343 | B2 | 12/2003 | McGill et al. |
| 6,766,764 | B1 | 7/2004 | Chrisey et al. |
| 6,792,326 | B1 | 9/2004 | Duignan |
| 6,805,918 | B2 | 10/2004 | Auyeung et al. |
| 6,815,015 | B2 * | 11/2004 | Young et al. ............ 506/40 |
| 6,835,426 | B2 | 12/2004 | Duignan et al. |
| 6,862,490 | B1 | 3/2005 | Duignan |
| 7,014,885 | B1 | 3/2006 | Pique et al. |
| 7,103,087 | B2 | 9/2006 | Eastburn |
| 2006/0008590 | A1 | 1/2006 | King et al. |
| 2009/0074987 | A1 | 3/2009 | Auyeung et al. |

FOREIGN PATENT DOCUMENTS

| | | |
|---|---|---|
| TW | 200918182 A | 5/2009 |
| WO | WO 2007/134300 A3 | 11/2007 |
| WO | WO 2009/035854 A1 | 3/2009 |

OTHER PUBLICATIONS

International Search Report of the International Searching Authority for Application No. PCT/US2008/074508, mailed on Nov. 28, 2008, 2 pages.

Written Opinion of the International Searching Authority for Application No. PCT/US2008/074508, mailed on Nov. 28, 2008, 5 pages.

Preliminary Report on Patentability for Application No. PCT/US2008/074508, mailed on Mar. 25, 2010, 6 pages.

International Search Report and Written Opinion of PCT Application No. PCT/US07/68902, mailed Aug. 28, 2008, 9 pages total.

Final Office Action for U.S. Appl. No. 11/970,495, mailed on Oct. 13, 2010, 16 pages.

Advisory Action for U.S. Appl. No. 11/970,495, mailed on Feb. 18, 2011, 3 pages.

* cited by examiner

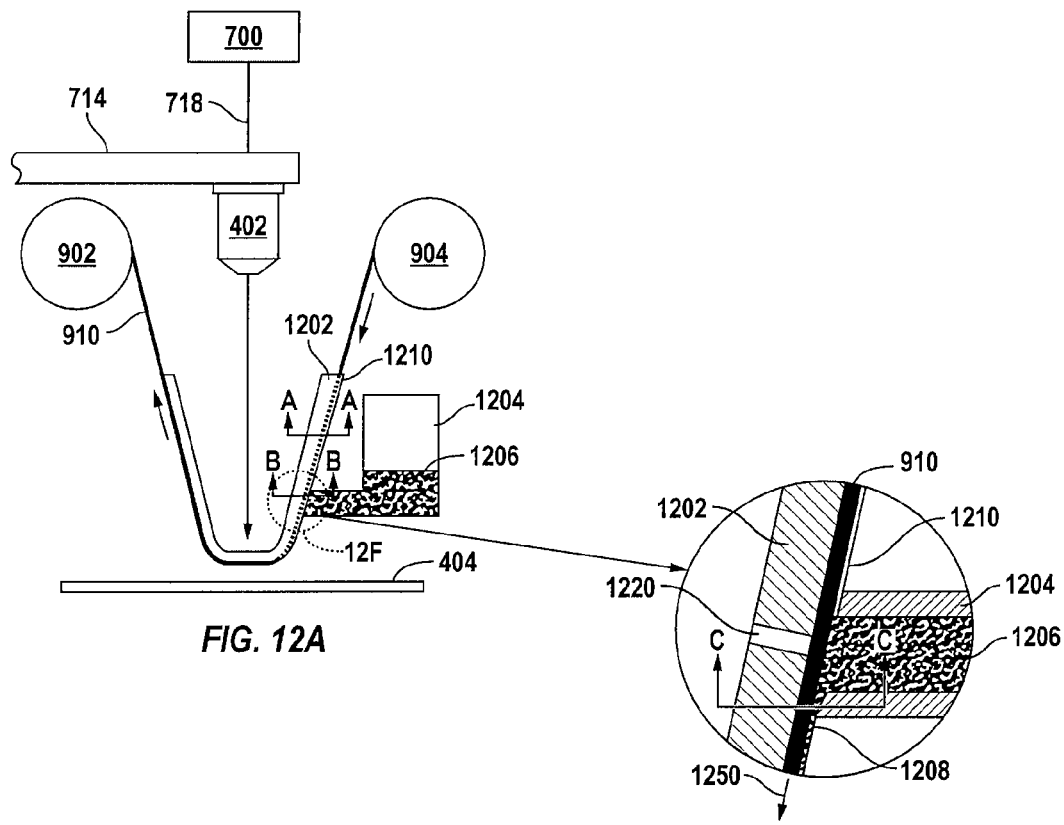
FIG. 12A
FIG. 12F
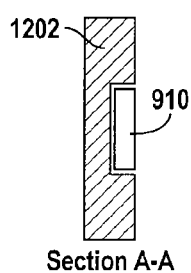
Section A-A
FIG. 12B
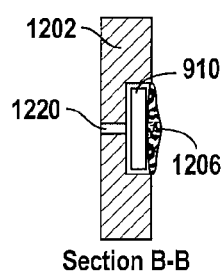
Section B-B
FIG. 12C
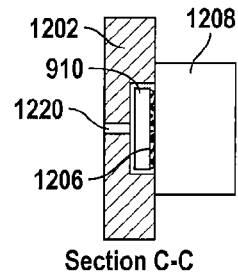
Section C-C
FIG. 12D
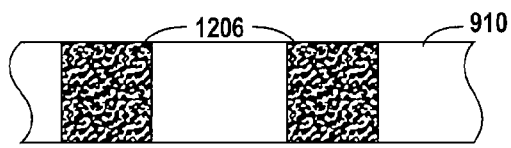
FIG. 12E

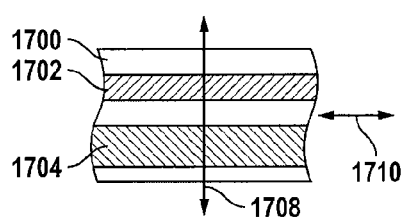 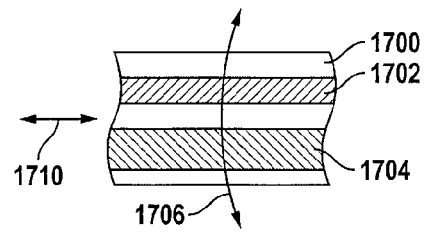
FIG. 17A  FIG. 17B
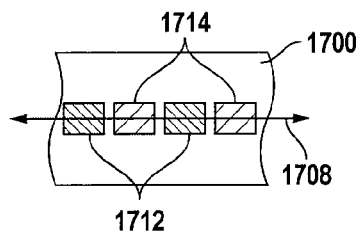
FIG. 17C
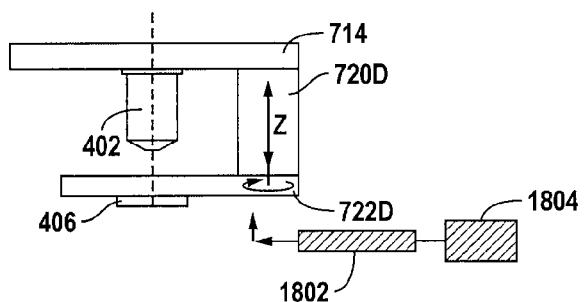
FIG. 18A
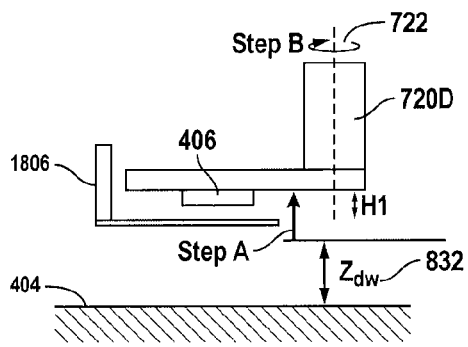 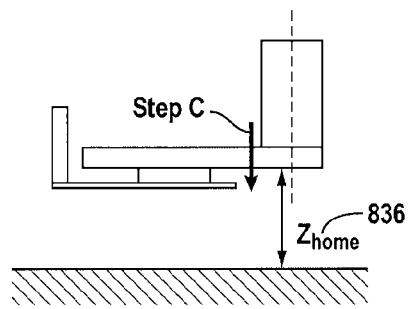
FIG. 18B  FIG. 18C
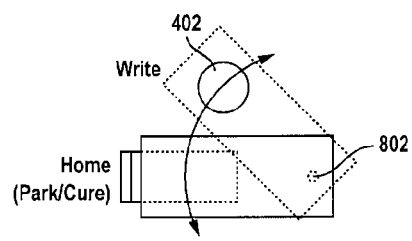
FIG. 18D

METHOD OF PERFORMING AN OPERATION WITH RHEOLOGICAL COMPOUND

CROSS-REFERENCES TO RELATED APPLICATIONS

The present application claims benefit under 35 USC 119 (e) of U.S. provisional application No. 60/747,158, filed May 12, 2006, entitled "Line Open Repair Apparatus and Method", the content of which is incorporated herein by reference in its entirety.

BACKGROUND OF THE INVENTION

The present invention relates generally to the non-contact repair of microelectronic circuits and in particular, to the repair of flat panel displays, such as active matrix liquid crystal display panels.

During the manufacturing of liquid crystal (LC) displays, large clear plates of thin glass are used as a substrate for the deposition of thin film transistor (TFT) arrays. Usually, several independent TFT arrays are contained within one glass substrate plate and are often referred to as TFT panels. Alternatively, an active matrix LCD, or AMLCD, covers the class of displays utilizing a transistor or diode at every subpixel, and therefore encompasses TFT devices. Such glass substrate plates may also be referred to as AMLCD panels. Flat panel displays (FPD) may also be fabricated using any of the organic light-emitting diode (OLED) technologies and though typically fabricated on glass, may also be fabricated on plastic substrate plates.

TFT pattern deposition is performed in a multitude of stages where in each stage, a particular material (such as a metal, indium tin oxide (ITO), crystalline silicon, amorphous silicon, etc.) is deposited on top of a previous layer (or glass) in conformity with a predetermined pattern. Each stage typically includes a number of steps such as deposition, masking, etching, stripping, etc.

During each of these stages and at various steps within each stage, many production defects may occur that may affect the electrical and/or optical performance of the final LCD product. Such defects include but are not limited to metal protrusion 110 into ITO 112, ITO protrusion 114 into metal 116, a so-called mouse bite 118, an open circuit 120, a short 122 in a transistor 124, and a foreign particle 126, as shown in FIG. 1. Other defects include mask problems, over or under etching, etc.

Even though the TFT deposition processes are tightly controlled, defect occurrence is unavoidable. This limits the product yield and adversely affects production costs. Typically, the TFT arrays are inspected using one or multiple automated optical inspection (AOI) system(s) following critical deposition stages and by an opto-electrical inspection machine, also referred to as array tester or array checker (AC) to test the finished TFT arrays. Usually AOI and AC systems provide defect coordinates; they do not provide high resolution images required to classify defects as killer defects, reparable defects, or imperfections that do not affect TFT array performance (also known as process defects). The defect coordinate information from AOI or test systems is passed to a TFT array review/repair tool, also referred to as array saver (AS), in which defects are reviewed, classified, and then repaired.

The average number of defects per plate may vary (a) depending on the maturity of the fabrication process, (b) from one TFT array manufacturer to another and (c) from one manufacturing plant to another. Typically, the defect review and repair capacity within the TFT array fabrication line is sized to process 300-400 defects per Generation 7 plate (2100 mm by 2400 mm in size. Typically 5 to 10% of defects per plate require repair.

Since the TFT array features are typically very small (sub-pixel size may be, for example, 80 by 240 micrometers and up to 216×648 micrometers for large 40 inch LCD televisions made from Generation 7 plates), the array review/repair tool includes a microscope to perform a defect review to decide whether the defect is repairable. The microscope field of view is small (ranging from 100×100 µm to 2×2 mm) relative to the plate size (typically 2.1×2.4 m). The microscope is installed on a precision XY stage so that it can be dispatched from one defect to another over the plate surface. The defect coordinates are known from inspections carried out earlier by AOI and AC inspection systems. The glass plate remains stationary under the XY stage by means of a vacuum chuck during the defect review and subsequent repair. The reviewed defects are classified, or binned, into various categories, including those requiring repair. The repairable defects are further binned by specific repair types, typically laser machining or cutting (also known as "zapping"), laser welding, or bridging an open line.

The above series of general events is typical of all array review/repair tools. The number, type, locations, size/degree of defects often vary from plate to plate and a means to pass judgment is required at almost all of the tool steps following capture of the defect images—for example, whether an image is truly a defect rather than nuisance, what kind of defect has been found, whether or not a specific defect needs repair, what kind of repair is required, what repair parameters are needed, what is the next defect to be repaired, and so forth. Some review/repair tools combine tool operation with human operator judgment and intervention to identify, classify, and then repair such defects. Other review/repair tools, such as the ASx60 family of review/repair tools manufactured by Photon Dynamics, Inc., include an automatic defect repair (ADR) capability that automatically, i.e. without human intervention, analyzes review and AOI/test data, identifies and classifies defects, and then sets up the repair parameters, and executes the repairs.

FIGS. 2 and 3 show two defect repair examples in cross sections. Metal protrusion defect 110 is shown in FIG. 2A (see FIG. 1 for top view). In this example, after identifying and classifying the defect 110, a repair recipe is created, and then executed to remove the protrusion, as shown in FIG. 2B. Material removal is a relatively straightforward process, using laser cutting techniques to control position and power/size parameters of the laser beam.

FIGS. 3A-3E represent the repair steps performed to correct an open path between metal lines 32 and 34. In this example, a laser 36 is used to break through ("zap") the passivation layer 38 to expose or cut into the metal lines. Then, a means to deposit material, a chemical vapor gas and moving laser energy source in this example, is introduced to create contact electrodes 42 and 44 on the metal lines 32 and 34. Thereafter a metal line 46 is formed to connect the two metal lines 32 and 34.

Compared to repairs requiring cutting such as shown in FIG. 2, repairs requiring correction of open paths such as shown in FIG. 3 are far more challenging, because new material must be introduced to correct such defects. Challenges include material integrity and compatibility, such as, adhesion, resistivity, continuity, line width, line thickness, etc., of the new material with the panel, accuracy of placement (plate circuit features and defects within them are typically less than 1 to 10 micrometer), and speed of application as the deposition process to repair a single open defect should take well less than tens of seconds, and so forth. Typical repair linewidths are less than 10 micrometers and lengths on the order of 100 micrometers, and the desired material deposition time per repair is on the order of seconds. In a production line, it is desirable to review and then repair defects within the same tool. A suitably selected direct write or printing approach can meet these challenges. "Direct write" is any technique for creating a pattern directly on a substrate, either by adding or removing material from the substrate, without the use of a mask or pre-existing form. Typically, direct write techniques may employ lasers or particle beams (for example, electron beams) that have beam diameters on the order of the desired repair line widths, and that are controlled with CAD/CAM programs. Direct write deposition methods include, for example, ink jet printing, laser chemical vapor deposition (LCVD), and other methods, some of which are described below.

Laser Direct Write Deposition Methods:

Laser chemical vapor deposition (LCVD) is a well known technique for open line repair of flat panel displays. It uses a laser beam focused on the surface of a substrate to induce localized chemical reactions. Often the substrate is coated with a precursor, which is either pyrolyzed or photolyzed locally where the laser beam scans. Pyrolytic laser CVD is roughly the same as thermal CVD. In photolytic CVD, a chemical reaction is induced by the interaction between the laser light and the precursors. FIGS. 3C and 3D represent the photolytic LCVD process. LCVD requires controlled atmospheres, specifically, a balance of precursor gas flows with vacuum, and hence, LCVD equipment includes gas flow controllers, valving, vacuum pumps, and other plumbing.

LCVD shortcomings include: (i) slow deposition rates (on the order of, for example, many tens of seconds for 3500 Angstrom thick, 5 micrometer wide by 100 micrometer long lines), (ii) requirement for controlled environment surrounding the area to be repaired; specifically, any gases near the repair must be purged and then inert gases or vacuum must be introduced to avoid contamination, (iii) requirement for preparation of surfaces prior to deposition for best adhesion, (iv) requirement for elevated surface temperature for best adhesion, (v) high complexity of manufacturing equipment, and (vi) potential to introduce contamination because of gas flows near the substrate.

Currently, the LCVD process is slow and its associated tools are expensive, and FP production lines typically include a number of lower cost review/cutting repair tools, such as the ASx60 products manufactured by Photon Dynamics, Inc., and a separate LCVD tool dedicated for line open repairs. FIG. 19B illustrates the current typical flow of FP plates through the sequence of review/repair tools in a production line.

Laser induced forward transfer (LIFT) methods for deposition of relatively small features were introduced in the 1980s. In the LIFT method, a pulsed laser beam is directed through a laser-transparent target to strike and vaporize a film of material to be transferred that coats the target substrate on the side opposite the laser beam. LIFT is a homogenous pyrolytic technique because the laser vaporizes the film material. Laser energy densities for LIFT metal transfer cited by Mayer (U.S. Pat. No. 4,752,455) are in the range of 1 to 10 J/cm$^2$. Vaporized material tends to be more reactive and more easily degraded, oxidized or contaminated. The LIFT method is not suitable for organic materials because it is a high temperature method. Further, since high temperatures are achieved at the target material, ablation or sputtering of the target substrate itself may also occur, resulting in transfer of the target substrate material which reduces the integrity of the purity of the desired film material. There have been reports that lines created by the LIFT process have poor uniformity, morphology, adhesion and resolution.

Micro-structuring by explosive laser deposition (MELD) is a variant of LIFT and is described by Mayer in U.S. Pat. Nos. 4,752,455 and 6,159,832. Mayer uses very short pulses (less than or equal to 20 psec) at very high repetition rates (10 MHz) at energies per pulse of 10 mJ. The laser beam passes through a transparent substrate whose opposite surface is metallized. The beam vaporizes the metal film material and propels it toward the target substrate. The typical energy density is approximately 1 to 3 J/cm$^2$. The '832 patent describes the use of ultrafast lasers. The laser metal transfer (LMT) process under development by Omron Corporation (Japan) is closest to the MELD work of Mayer. Since both LIFT and MELD require the vaporization and condensation of a metal film on the surface of a substrate, the functionality (i.e. electrical conductivity) of the resulting patterns is marginal since the material exhibits numerous discontinuities between adjacent voxels (or transferred 3-dimensional pixels).

Ink deposition via painting, brushing, jetting has been a path of interest for direct write of electronic circuits since the mid-1990s using lasers with narrow beams and nano-inks (with metal particles on the order of five to many tens of nanometers in size). The United States Department of Defense's Defense Advanced Research Projects Agency (DARPA) Mesoscopic Integrated Conformal Electronics (MICE) program from about 1999 to 2002 funded several direct write technology approaches, with target line widths in the mesoscopic range (1 to 100 micrometers).

Aerosol jet is a method of application of ink material to a substrate developed by Optomec, Inc., Albuquerque, N. Mex., under the DARPA MICE program. In this method, the delivery system includes (1) an atomizer that breaks the ink into a distribution of droplets of 1 to 10 micrometer diameter, with a mean of approximately 5 micrometer, and (2) a delivery head that includes a sheath gas jet concentrically placed around the ink stream. The concentrically placed gas focuses the ink stream. The deposited ink line must then be cured. Current techniques employ a wide distribution of droplet sizes. The technology seems to be most successful in direct write deposition of metal lines greater than 20 micrometers, and has found application in fabrication of three dimensional structures well above the 100 micrometer size. However, shortcomings of this approach to achieve lines less than 10 micrometer in width include: (i) highly complex process dependencies (for example, ink temperature, ink viscosity, atomizer pressure and temperature, gas sheath flow), (ii) frequent clogging of delivery needle, (iii) mean of droplet distribution limited to approximately 5 micrometer, which limits line width minimum to approximately 7 micrometer, (iv) limited to materials having viscosities less than about 1000 cP; and (v) factors determining linewidth include mean of droplet distribution, ink viscosity, ink/substrate surface tension, temperature.

The application of printer inkjet technologies for direct write deposition of microcircuits continues to be explored. Inkjet printhead droplet-on-demand dispensing technologies using piezoelectric, thermal, electrostatic, acoustic, or other drives have been well documented. Production-level applications typically dispense droplets in the tens of picoliter volume or more. Ten picoliters is equivalent to approximately a 26 micrometer diameter sphere. For repair of microcircuits found in flat panel displays, however, line widths of less than 10 micrometers are required. If some allowance for spreading of the deposited ink is included, droplets of diameter 4 micrometers may satisfy FP repair requirements, and such droplet sizes are equivalent to tens of femtoliters of volume. Though developments continue, inkjet technologies for very fine line widths have not yet been proven for production. Many of the same limitations listed above for aerosol jet technology apply to the print-on-demand inkjet technologies.

The matrix-assisted pulsed laser evaporation direct-write (MAPLE-DW) was developed under DARPA's MICE program by Chrisey and Pique of the U.S. Naval Research Laboratory. The MAPLE-DW approach is described by U.S. Pat. No. 6,177,151 (the '151 patent) and U.S. Pat. No. 6,766,764 (the '764 patent). Several subsequent variations of MAPLE-DW are described by U.S. Pat. Nos. 6,805,918 (the '918 patent) and 7,014,885 (transfer of rheological materials) (the '885 patent), and U.S. Pat. No. 6,815,015 (jetting behavior) (the '015 patent). U.S. Pat. Nos. 7,014,885 and 6,815,015 are incorporated herein by reference in their entirety. The MAPLE-DW process is a variant of LIFT, and the key distinction between the two is that in LIFT, the material to be transferred is ablated or vaporized, and therefore substantially changed during the transfer due to the high energy applied, while in MAPLE-DW the transferred material is substantially unchanged.

The key differences amongst the three variants (MAPLE-DW, rheological, and jetting) lie primarily in (a) the nature of the material to be transferred, (b) the laser energy density, and (c) the transfer mechanics which depends on both the nature of material and available energy. The MAPLE-DW process describes combining a transfer material with a matrix material, which specifically has the property of being more volatile than the transfer material when exposed to pulsed laser energy. The transfer materials may include but not be limited to metals or non-metals including insulators as well as biological materials. The coated material (matrix plus transfer materials) is assumed to be in solid state during the deposition process. Transfer energy densities for metals using the MAPLE-DW process are cited in '151 and '764 as typically 300 to 500 $mJ/cm^2$. The MAPLE-DW transfer mechanism consists of volatizing or vaporizing the matrix material, which then causes desorption of the transfer material from the supporting ribbon to the receiving substrate. The MAPLE-DW process assumes that after transfer, the deposited material needs no additional processing.

The rheological material and process is described in the '918 and '885 patents, which define rheological materials as the class of material with properties that lie in a range between solid and liquid, and are characterized by at least one fundamental rheological property such as elasticity or viscosity. Further, the rheological materials include but are not limited to gels, pastes, inks, concentrated solutions, suspensions, Newtonian and non-Newtonian fluids, viscoelastic solids and elastiviscous fluids. The rheological materials may include but not be limited to metal or non-metal including insulators as well as biological materials. The rheological materials are homogeneous mixtures comprised of (for example) functional materials, solvent or vehicle, chemical and rheology precursors, binders, surfactants, dispersant agents, powders, and/or biomaterials. The functional material is the material that contains the functional properties (such as electrical, magnetic, and so forth) of the desired deposit. Transfer energy densities for metals using the rheological material transfer process were cited in the '918 patent examples as 400 to 500 $mJ/cm^2$. The rheological material transfer mechanism as described by the '918 and '885 patents consists of the following steps: (a) the laser energy locally heats a very small volume of the rheological fluid near the supporting ribbon surface, and then (b) the vaporized material generates a high pressure burst that propels the non-vaporized fluid forward to the receiving substrate. The material that is transferred is substantially unchanged rheological fluid. Most deposition materials require post-processing such as thermal, photothermal, or photolytic processes to decompose any chemical precursors, or drive off solvent vehicles, or consolidate or density or sinter the functional materials and permanent binders.

The jetting effect described in the '015 patent occurs under narrow process window conditions using rheological fluids. Specifically, the transfer energy density is tailored to control the transfer process so that the material transferred remains roughly the same size or smaller than the incident laser beam profile. Transfer energy density for the jetting process reported in the '015 patent is less than 100 $mJ/cm^2$. Operation in the jetting window is advantageous in that feature sizes comparable to the incident laser beam size may be created. More specifically, such feature sizes may be in the range less than 10 micrometers, which is the requirement for repair of FP open line defects. However, the conditions for jetting behavior as described in the '015 patent requires relatively thick coatings (1 to 20 micrometers thick, and more specifically 5 to 10 micrometers in the cited example) on the transparent ribbon, which result in equally thick transferred features, far larger than the sub-micron thickness required in FP repair.

Of highest interest for the FP industry are the processes that support ink or rheological materials because deposition repairs may require non-metals, for example, photoresist materials or organic-based materials used in color filters, as well as conductive materials, for example, metals. However, as noted already, typical minimum feature sizes required for FP repair are 5 micrometer wide by typically 0.2 to 0.4 micrometer thick lines with relatively small edge roughness, on the order of a few tenths micrometer. Most of the direct write techniques described above can easily achieve 30 micrometer line widths, and with some additional but modest effort, 10 micrometer line widths. Except for LCVD, other ink-based DW techniques, for example, jetting, cannot routinely achieve uniform and continuous sub-micron line thicknesses.

Limitations to achieving 5 micrometer wide by 0.3 micrometer thick lines with good edge roughness using ink/rheological materials include, for example, (i) material flow at the receiving substrate surface, which can be a function of delivery or substrate temperature, viscosity, substrate material or surface conditions, (ii) delivered droplet size (aerosol jet or ink jet) or delivered material size and thickness (material transfer methods), (iii) relative position of the delivery mechanism to the receiving substrate. In the case of an ink jet system, for example, too large a distance may result in too wide a line (spread of jet) while too close a distance may also result in too wide a line (splatter of the jet). Additional limitations to achieving 5 micrometer wide lines with good edge roughness using ink/rheological materials include: (iv) material particle size in the ink or rheological material, for metals, typical metal particles sizes should be in tens of nanometers or less, (v) aperture size in delivery mechanisms, and (vi) beam size of the laser or energy source.

The materials to be transferred in the LIFT and MAPLE-DW processes are usually solids, whereas the rheological materials are homogeneous mixtures including functional material, solvent or carrier materials, binders, dispersants and so forth, any of which contribute to the rheological properties such as viscosity. Some selected rheological materials may include solvents or fluids with low, but non-zero, vapor pressures, which implies potential change in the rheological material over time due to evaporation of such solvents or fluids. Thus, for consistent results, particularly at line widths less than or equal to 5 micrometers, a requirement is that the rheological material to be transferred have consistent properties over time. Ensuring this requirement may be achieved in several ways: (a) place the rheological material to be transferred within an environment that inhibits change (for example, control temperature and pressure conditions), or (b) control the sequencing of process and handling steps such that the rheological material's exposure time at transfer is always the same.

Duignan et al in U.S. Pat. Nos. 6,792,326, 6,583,318, 6,82, 490, 6,85,426, and 6,649,861 reference describe an apparatus for MAPLE-DW. Duignan's apparatus cannot be applied to laser direct write methods using rheological materials for a number of reasons such as (a) Duignan does not accommodate the requirement for maintaining consistent rheological material properties over time, (b) Duingan does not provide for the requirement for post-processing for the purposes of driving away the carrier components within the rheological fluid, etc.

Thus, there is a need for an apparatus and methods that enable repeatable deposition repairs using the rheological materials and associated process steps.

The NRL team and Duignan et al. describe apparatus and methods combining laser direct write deposition with laser machining (zapping), and both groups describe machining for preparation of the receiving substrate prior to deposition and machining or trimming of the resulting deposition. In the '918, '885, and '015 patents, the NRL team introduces the requirement for post processing (curing). Addiego in U.S. Pat. No. 5,164,565 combines a laser machining (cutting) repair function with a deposition repair function, but does not include the critical review function required for FP production.

As described already and noted in FIG. 19B, the current production flow of flat panels through a production line uses two kinds of tools to cover all types of FP repairs: (i) a review/cutting repair combined tool and (ii) a stand-alone deposition repair tool. Thus, there is a need for a low cost, fast defect review/repair tool that combines the review and all repair functions, and more specifically, automatically reviews and classifies defects, and then produces and executes instructions for cutting repairs and deposition repairs (such as those using rheological materials) while the panel of interest remains loaded within the tool.

BRIEF SUMMARY OF THE INVENTION

An apparatus, in accordance with one embodiment of the present invention, includes integrated review, material removal and material deposition functions. The apparatus performs the review, material removal and material deposition (transfer) operations along the same optical axis (path). The apparatus includes, in part, a camera, a pair of lenses, and one or more lasers. A first lens is used to focus the camera along the optical axis on a structure formed on the target substrate undergoing review. The first lens is also used to focus the laser beam on the structure to remove a material present thereon if the reviewed structure is identified as requiring material removal. The second lens is used to focus the laser beam on a ribbon to transfer a rheological compound from a recessed well formed in the ribbon to the structure if the reviewed structure is identified as requiring material deposition. Additional review operations may be carried out following the removal or deposition operations.

In one embodiment, the rheological compound provides an electrical connection between a pair of nodes present on the substrate. In one embodiment, the substrate may be a flat panel display with an array of pixels, a solar panel, etc.

In one embodiment, the apparatus further includes, in part, an auto-focus sensor having an optical path coaxial with the optical path of the camera, the first and second lenses when selectively used in operation, and the laser beam. The auto-focus sensor maintains the distance between the substrate and the first lens within the predefined range during the material removal operations. The auto-focus sensor further maintains the distance between the ribbon and the second lens within the predefined range during the transfer of the rheological compound. In some embodiments, the auto focus sensor is a tracking auto focus sensor maintaining the distance between the ribbon and the substrate within the predefined range as the ribbon is moved relative to the substrate.

In one embodiment, the laser beam is used to cure the rheological compound deposited on the substrate. In another embodiment, a heat source is used to cure the rheological compound after it is deposited on the substrate. The heat source may be a laser beam different from the laser beam used during removal and/or deposit operations.

In one embodiment, the apparatus further includes a variable shape aperture that remains centered about the laser beam as the ribbon is moved relative to the laser beam. In another embodiment, the apparatus further includes a variable shape aperture that varies about a center of the laser beam so as to step across a field of view of the second lens. In one embodiment, the laser beam is a blended laser beam having a multitude of wavelengths present therein concurrently. In another embodiment, the laser beam has a single wavelength that is selected depending on the operating requirements. The pulse length of the laser beam may also be varied.

In one embodiment, the apparatus includes a ribbon preparation assembly adapted to prepare the ribbon on-demand. The ribbon is transparent to the wavelength of the laser beam and includes a recessed well coated with the rheological compound adapted to be positioned in the path of the laser beam to be transferred to the substrate. The ribbon optionally includes a second recessed well coated with another rheological compound. In yet another embodiment, the ribbon includes a first multitude of recessed wells and a second multitude of recessed wells interleaved with the first multitude of recessed wells. The first multitude of recessed wells is formed coated with a first rheological compound, and the second multitude of recessed wells is coated with a second rheological compound. In another embodiment, the ribbon is prepared by an assembly not disposed in the apparatus.

In one embodiment, the apparatus further includes, in part, a first Z-axis controller adapted to move the first lens relative to the substrate and in parallel to the optical path, and a second Z-axis controller adapted to move the ribbon with respect to the second lens and in parallel to the optical path. The second Z-axis controller may be further adapted to park the ribbon in a home position and/or move the ribbon to a load/unload height to enable changing of the ribbon. In one embodiment, the apparatus further includes a cover adapted to house the ribbon and to control the environmental parameters, such as temperature, humidity, etc, when the ribbon parked in the cover.

In one embodiment, the apparatus further includes, in part, a rotational axis controller adapted to rotate the ribbon relative to the second lens about an axis parallel to the optical path. The rotational axis controller rotates the ribbon at a first angle to park the ribbon in a home position and rotates the ribbon at a second angle to enable changing of the ribbon. In one embodiment, the apparatus further includes, in part, an axis controller adapted to move a relative position of the ribbon in a plane perpendicular to the optical path of the laser beam, and/or to move a relative position of the substrate in a plane perpendicular to the optical path of the laser beam.

An apparatus, in accordance with another embodiment of the present invention, includes, in part, a first module adapted to form a recessed well in the ribbon; and a second module adapted to dispense ink in the recessed well. The apparatus further includes a third module adapted to park the ribbon in a home position, a cover adapted to cover the ribbon when the ribbon is parked in the home position, and a temperature controller adapted to control the temperature of the ribbon parked in the cover.

BRIEF DESCRIPTION OF THE DRAWINGS

FIG. 12 is an on-demand ribbon assembly, in accordance with another embodiment of the present invention.

FIGS. 12B-12E are various cross-sectional views of the ribbon preparation module of FIG. 12A.

FIGS. 17A and 17B are top views of inked ribbons each having two inked regions, showing directions of motion relative to the laser beam for the two embodiments illustrated in FIG. 8A and FIG. 8D, respectively.

FIG. 17C is a top view of a ribbon with inked areas of two different materials alternating in sequence, and showing direction of motion relative to the laser beam for the embodiment illustrated in FIG. 8A.

FIG. 18A shows an embodiment adapted to place a moveable cover over the inked portion of the ribbon parked in a home position.

FIGS. 18B and 18C are side views of an embodiment adapted to park the ribbon over a stationary shelf.

FIG. 18D is a top view of the rotational movement of the ribbon over the stationary shelf of the embodiment shown in FIGS. 18B and 18C.

DETAILED DESCRIPTION OF THE INVENTION

An apparatus, in accordance with one embodiment of the present invention, includes integrated review, material removal and material deposition functions. The apparatus performs the review, material removal and material deposition (transfer) operations along the same optical axis (path). The apparatus includes, in part, a camera, a pair of lenses, and one or more lasers. A first lens is used to focus the camera along the optical axis on a structure formed on the target substrate undergoing review. The first lens is also used to focus the laser beam on the structure to remove a material present thereon if the reviewed structure is identified as requiring material removal. The second lens is used to focus the laser beam on a ribbon to transfer a rheological compound from a recessed well formed in the ribbon to the structure if the reviewed structure is identified as requiring material deposition.

For purposes of the invention described herein, the terms "ink" and "rheological material" are used interchangeably. Specifically, rheological materials include the class of material of properties that lie in a range between solid and liquid, and are characterized by at least one fundamental rheological property such as elasticity or viscosity. Further, the rheological materials include but are not limited to gels, pastes, inks, concentrated solutions, suspensions, Newtonian and non-Newtonian fluids, viscoelastic solids and elastivisocous fluids. The rheological materials are homogeneous mixtures comprised of (for example) functional materials, solvent or vehicle, chemical and rheology precursors, binders, surfactants, dispersant agents, powders, and/or biomaterials. The functional material is the material that contains the functional properties (such as electrical, magnetic, and so forth) of the desired deposit. The rheological materials may be metal or non-metal materials with particle sizes ranging from 5 to 500 nanometers and suspended within one or more solvents and/or binders, and having viscosity in the range of approximately 1 cP to 1,000,000 cP.

Figure 4A:
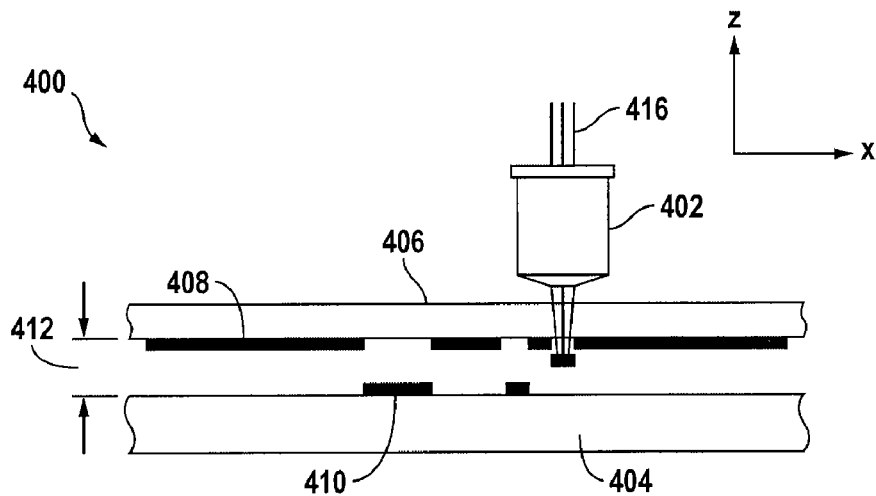
FIG. 4A shows a cross sectional view of an apparatus adapted for direct write laser transfer of transfer material from a ribbon to a substrate, in accordance with one embodiment of the present invention.

FIG. 4A shows a schematic of the key components of an apparatus 400 required for laser transfer of rheological materials devised by Pique et al., as described in U.S. Pat. No. 7,014,885. The rheological material or ink to be transferred 408 is applied to a transparent ribbon 406 facing the receiving substrate 404. The ribbon serves as a supporting structure for the rheological material, and must be optically transparent to the laser wavelengths of interest. A pulsed laser beam 416 is directed through focusing optics such as an objective, or final, lens 402 at the ribbon surface opposite the ink, and the ink is transferred to the receiving substrate 404. A transferred pattern 410 is formed on the receiving substrate by moving the laser 416 with respect to the receiving substrate 404, and moving the ribbon relative to the laser such that an inked region is always available for transfer. The transferred pattern on the receiving substrate may require curing (not shown).

Experiments by the inventors to establish the jetting regime of laser transfer of rheological materials indicated that repeatability and reproducibility of the line integrity (width, continuity, thickness, uniformity, etc.) of lines that are nominally five micrometers wide or less seem to be particularly sensitive to gap repeatability, material composition repeatability, and form repeatability. In particular, the inventors discovered that a regime of operation very distinct from the jetting regime described in the '015 patent is required to achieve the desired small line widths and sub-micron thicknesses. This non-jetting regime of operation is called "template" or "decal" transfer, and requires apparatus and methods that can deliver the rheological material to be transferred in a repeatable composition and form (for example, thickness) at a repeatable position relative to the laser beam and receiving substrate. The proposed invention describes such a laser transfer apparatus that may be operated in the template transfer regime.

Repeatable vertical positioning (Z in FIG. 4A) of the rheological material 408 to be deposited relative to the receiving substrate 404 is critical for repeatable transferred features that are approximately equal to or less than 5 micrometer in size. The operating gap 412 is less than 25 micrometers in some embodiments, but within less than 5 micrometer repeatability. Various methods may be applied to position the ribbon at a repeatable small gap, in accordance with the present invention.

Figure 4B:
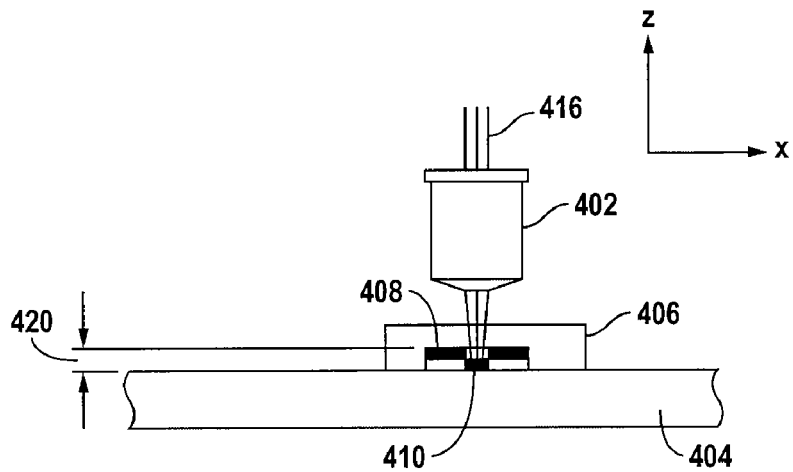
FIG. 4B shows a schematic cross sectional view an apparatus adapted for direct write laser transfer of transfer material from a ribbon to a substrate, in accordance with another embodiment of the present invention.

In accordance with one embodiment, ribbon 406 is mounted to a high resolution Z-stage, and is thus maintained within a fixed distance from substrate 404 by using an active feedback from a gap sensing device such as an autofocus sensor. Autofocus systems are described in US application number 014116-009710US, filed Dec. 20, 2005, commonly assigned, entitled "Tracking Auto Focus System"; and U.S. Pat. No. 7,084,970, commonly assigned, the contents of both of which are incorporated herein by reference in their entirety. In accordance with another embodiment, the ribbon is mounted to an air bearing. The established air flow conditions are then used to maintain a fixed repeatable small gap. In accordance with yet another embodiment, to maintain a constant position, a recess or well is formed in the ribbon and is then filled with the rheological material, as illustrated in FIGS. 4B and 4C.

Figure 4C:
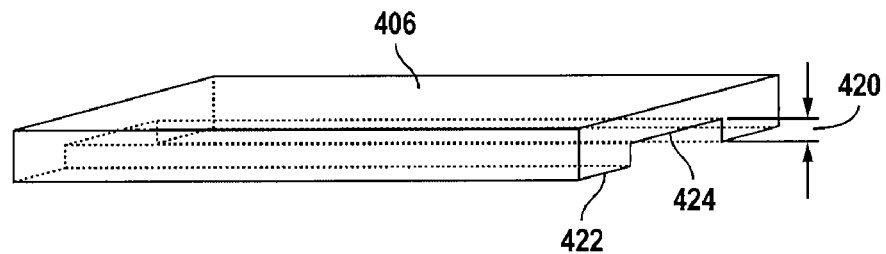
FIG. 4C shows the ribbon with recessed well used in the apparatus of FIG. 4B, in accordance with one embodiment of the present invention.

FIG. 4C is a perspective view of ribbon 406 having recessed well 424 formed therein. Recessed well 424 provides a means to achieve repeatable uniform thickness of the rheological material disposed in the well. The non-recessed surface 422 can contact the receiving substrate 404 without contaminating the receiving substrate with untransferred ink material. In one embodiment, a well depth 420 of a few tenths of a micrometer to a several micrometers is used to provides a suitable line integrity at nominal 5 micrometer line widths and submicron line thicknesses. Further, the recessed well may be used in combination with any of the other positioning methods described above to establish and maintain a fixed gap between bottom surface 422 of ribbon 406 and substrate 404.

The compositional balance of the rheological material required by the laser transfer process in the template transfer regime may change over time due to, for example, evaporation of any of the fluids contained therein. Preservation of the composition may be achieved by several means, including covering the rheological material or ink when not in use, returning the inked ribbon to a storage container, which may be environmentally controlled (for atmosphere, temperature, humidity, etc.), applying ink from a bulk supply when required, and so forth.

Figure 5A:
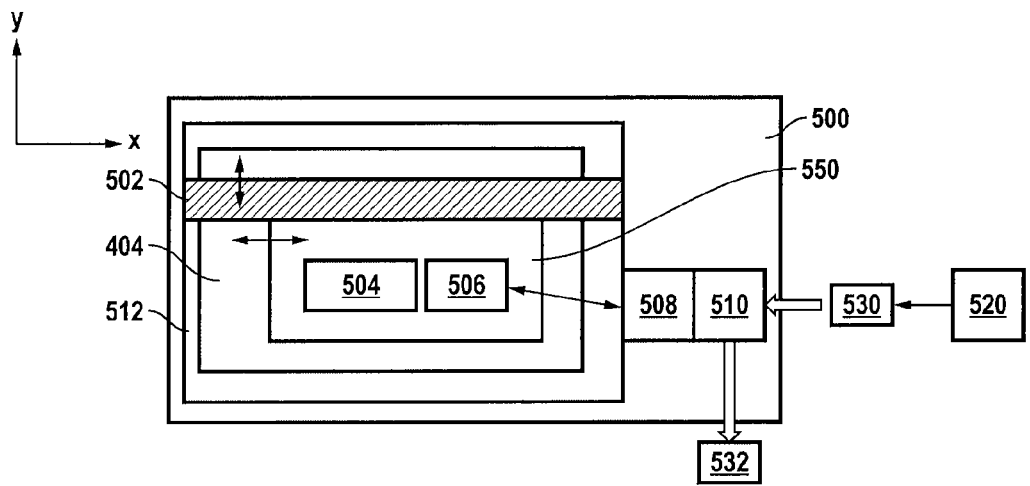
FIG. 5A is a functional block diagram of an integrated review/repair tool, in accordance with one embodiment of the present invention.
Figure 6:
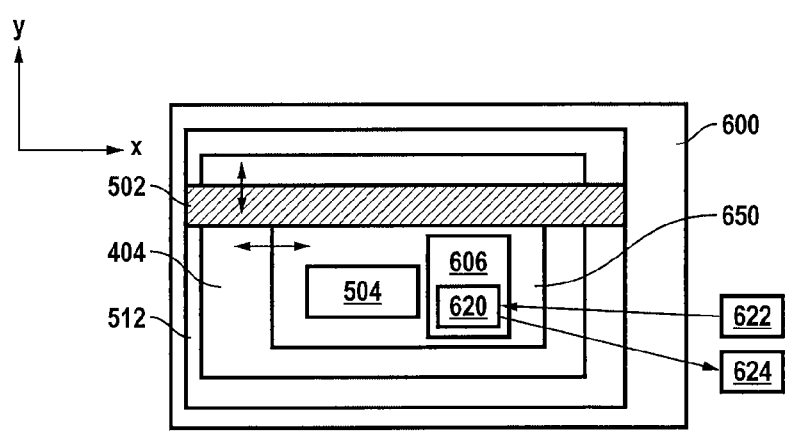
FIG. 6 is functional block diagram of an integrated review/repair tool, in accordance with another embodiment of the present invention.

A number of embodiments of the present invention are adapted for maintaining compositional balance of the rheological, as described further below. FIG. 5A is a functional block diagram of a review and repair apparatus (alternatively referred to herein below as review and repair tool, or tool) 500 in accordance with which direct write ribbons 406 are prepared off the tool, i.e., off-board). FIG. 6 is a functional block diagram of a review and repair tool 600 in accordance with which the direct write ribbons 406 are prepared on the tool, i.e., on-board) when required, i.e., on-demand). In both tools 500 and 600, the review and zap repair functions are integrated with the direct write function within the optics payload of that tool. For example, in tool 500, the review and zap repair functions 504 are integrated with the direct write function 506 within the tool's optics payload 550. Similarly, in tool 600, the review and zap repair functions 504 are integrated with the direct write function 606 within the tool's optics payload 650. Each payload, 550 or 650, is attached to the cross-beam of a gantry stage 502, and may move in the X-direction while the gantry 502 moves in the Y-direction, and the combined movements enable coverage by the payload of the full substrate area 404. In another embodiment, the substrate is moved beneath a stationary payload. For relatively large substrates, such as those required for flat panel displays, which may be 1 meter by 1 meter or more in size, a smaller tool footprint, and hence lower effective cost, is achieved by moving the optics payload over a stationary substrate.

The terms block, module and function are used interchangeably herein. In the embodiment shown in FIG. 5A, a ribbon load/unload block 508 and a ribbon storage block 510 are shown as being included in tool 500; these two blocks may or may not be positioned on the moving gantry 502. Ribbons may be prepared in block 520 positioned off tool 500 and then loaded into cassettes 530 also positioned off tool 500. In one embodiment, ribbon storage block may be a simple container or housing with suitable openings for exchange, and if required, control of environmental parameters such as temperature, humidity, pressure, and so forth. In one embodiment, ribbon load/unload block 508 may be a robotic load/unload device that transfers new ribbons from ribbon storage container 510 to direct write module 506. The robotic device also transfers used ribbons from the direct write module 506 back to the ribbon storage container 510. The ribbon load/unload block 508 may be physically integrated with the ribbon storage container 510 in some embodiments. In some embodiments, the cassettes of new ribbons 530 and the cassettes of used ribbons 532 may be automatically transferred between the ribbon preparation block 520 and the ribbon storage 510. In some embodiments, these cassettes may be manually transferred.

Figure 5B:
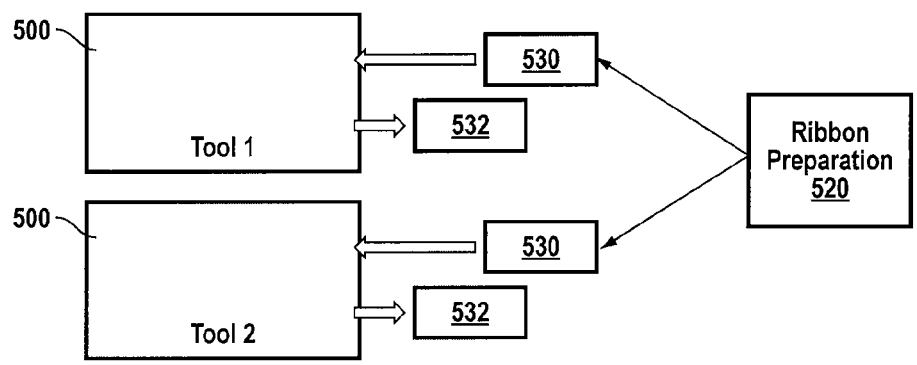
FIG. 5B is a block diagram a two review/repair tools each having an associated cassette of new ribbons supplied by a single ribbon preparation station, in accordance with one embodiment of the present invention.

FIG. 5B shows a pair of review/repair tools 500 each having an associated cassette of new ribbons 530 and an associated cassette of used ribbons 532. As shown, both cassettes of new ribbons 530 are supplied by a single ribbon preparation module 520. Other embodiments may include any number of review/repair tools 500 (greater or equal to one) that are supplied with any number of ribbon preparation modules (greater than or equal to one).

Referring to FIG. 6, direct write module 606 includes a replaceable on-demand ribbon cartridge 620, described further below. Ribbon cartridge 620 may include a ribbon and other components required to apply ink to the ribbon. The cartridge 620 may be replaced by a fresh cartridge 622 when its ink supply is consumed or no longer usable, or when the ribbon is no longer usable. In some embodiments, the ink supply may also be in cartridge form, and may be separately replaced within the ribbon cartridge 620.

Figure 7:
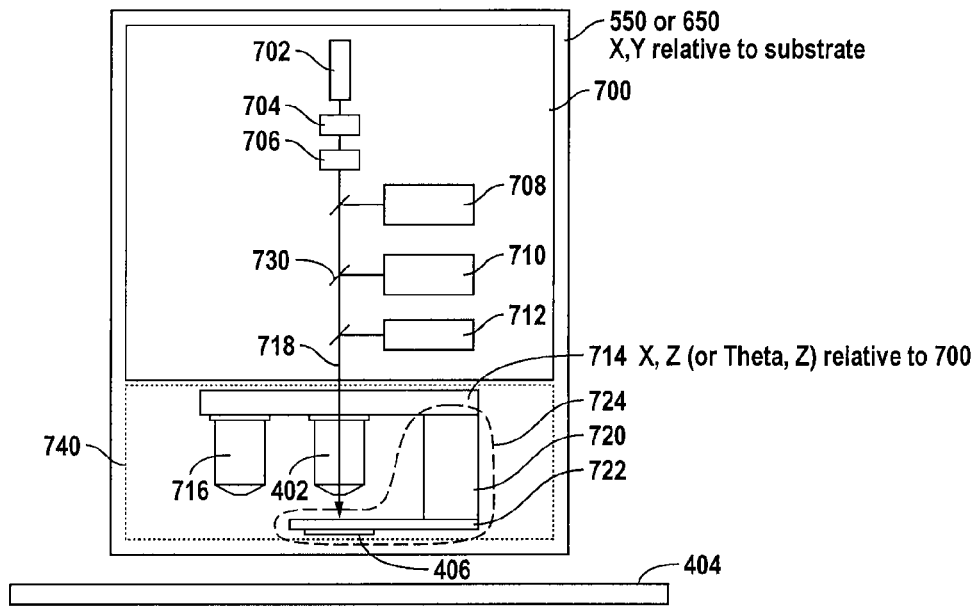
FIG. 7 is a block diagram of the optics payloads of FIGS. 5A and 6, in accordance with one embodiment of the present invention.

FIG. 7 is a more detailed view of various blocks disposed in review and repair payloads 550 and 650 of FIGS. 5A and 5B, respectively. Each review and repair payload (alternatively referred to hereinbelow as payload) includes blocks to perform integrated review, zap repair, direct write repair and cure functions on the structures formed on a substrate. Each payload includes a common optics block 700, and a movable final lens assembly 740. The movable final lens assembly 740 includes, in part, selectable final lenses and a direct write block (alternatively referred to hereinbelow as module).

The common optics block 700 is shown as including (i) an imaging block 708 that, in turn, includes a camera and illuminator and associated optics for delivery of illumination to the structures formed on substrate 404 and delivery of images from the substrate, (ii) a laser assembly 702 and associated optics 704 required for delivery of any one or more of a number of different wavelengths selectable by a user and defining energies and pulse widths of the laser beam, (iii) a variable aperture 706 placed in the laser beam optical path to provide a shaped profile at the substrate 404, and (iv) an autofocus assembly 710 with associated optics to track substrate plane 404 or ribbon plane 424 and provide feedback to the Z-focus controller of the movable final lens assembly 740 to maintain focus of the final lens, 716 or 402, on the substrate or ribbon planes.

Cure hardware 712, also disposed in common optics block 700, may consist of a laser (continuous wave or pulsed) or a laser diode and any associated optics required to provide a thermal source to cure the transferred material deposited during direct write transfers. Alternatively, laser assembly 702 may be configured to provide the necessary curing parameters (pulse length, energy). In yet another embodiment, cure hardware 712 may be incorporated in the movable final lens assembly 740. Although not shown, it is understood that one or more control modules may be used to control the various components used in payloads 550 and 650.

Laser 702 may be a diode pumped laser, a flash-lamp pumped laser, a continuous wave laser, or any other laser suitable for material removal and material transfer. Commercially available pulsed lasers typically span the full spectral range from ultraviolet (UV) to infrared (IR), and more specifically from 256 nm to 1064 nm, and with pulse widths range from $10^{-12}$ to $10^{-6}$ seconds, and pulse repetition frequencies from 0 to more than 100 KHz. An example of a suitable laser is a frequency quadrupled or tripled Q-switched Nd:YAG laser, having a wide range of wavelengths such as 1064 nm (infrared), 532 nm (green), 365 nm (ultraviolet), 266 nm (deep UV), and providing pulses less than 100 nanoseconds, and typically, between five and thirty nanoseconds. The beam profile of the laser may be Gaussian. Laser fluence for cutting repair applications is typically of the order of 1 J/cm$^2$, while the requirement for laser transfer of rheological materials in the jetting regime is typically of the order of 100 mJ/cm$^2$. Thus, a laser 702 that serves both cutting and deposition repair functions should provide a range of fluences of at least 0.01 to 5 J/cm$^2$. Further, the laser 702 and its optics 704 may provide two or more wavelengths simultaneously; for example, a user-definable blend of 1064 nm with 532 nm. Further, the laser 702, such as a Q-switched laser, may be configured to provide pulses less than 100 nanoseconds for transfer and for cutting repair, and also pulses that are several hundred microseconds long (for example, 100 to 300 microseconds) for curing of the transferred line.

In one embodiment of the invention the variable shape aperture 706 may be a movable slit aperture. Such a movable slit aperture may be comprised of four adjustable edges, two that may move in +/−x direction and two that may move in +/−y direction. In one embodiment, the edges are adjusted so that the variable shape aperture 706 remains symmetrically centered on the beam axis 718. The variable shape aperture may provide, for example, rectangular shapes ranging up to about 500 by 500 micrometers. In another embodiment, the variable shape aperture 706 may include two fixed edges and two moving edges. The two fixed edges may be at right angles forming one corner. One of the two moving edges moves in +/−x direction and the second one moves in +/−y direction. In such embodiments, the aperture center may not remain on the beam axis. The variable shaped aperture 706 enables writing with different sized features. For example, a 5 micrometer wide by 50 micrometer long line may be composed of ten 5 micrometer squares, or alternatively, a single 5 micrometer by 50 micrometer rectangle, with the latter being completed within a single laser shot, while the former requires ten shots, taking ten times as long to write. The variable shape aperture allows configuration of a desired line pattern with the largest possible features in the fewest steps, and therefore completion of writing within times that are far shorter than those achieved by any other conventional direct write method.

Repeatable vertical positioning (Z in FIG. 4A) of the rheological material to be deposited 408 relative to the focal plane of the final lens 402 has been shown to be critical for laser transfer in the jetting regime to achieve 5 micrometer line widths. The autofocus unit 710 may thus be used in review functions in which images of defects are collected by imaging block 708, during laser machining (zap) repair, and also during setup of direct write deposition repair.

The main optical or beam paths of components 702, 708, 710, and 712 are arranged to be substantially coaxial and exiting from block 700 on a single axis 718. The coaxial optical/beam paths 718 are thus available to any of several final lenses mounted on a single axis stage plate 714 within the movable final lens assembly 740. The arrangement of a coaxial optical/beam paths enable multi-function capability with a single final lens. For example, the review functions using imaging block 708, zap (removal) functions using laser and optics assembly 702, 704, 706, and autofocus 710 functions may be provided through a single final lens selected for the movable final lens assembly 740, thus minimizing switching time between functions. Alternatively, a smaller set of combined functions may be achieved in one final lens, while the remaining functions may use one or more other final lenses. In other words, laser 702 and its associated optics 704, imaging block 708, aperture 706, auto-focus assembly (also referred to herein as auto-focus sensor) and cure source 710 have the same optical axis (also referred to as optical path) 718. The optical axis of lens 402 is coaxial with optical axis 718 when lens 402 is selectively positioned in place to perform a write operation so as to transfer the rheological compound from the ribbon to the substrate. Likewise, the optical axis of lens 716 is coaxial with optical axis 718 when lens 716 is selectively positioned in place either to capture an image of the substrate in order to perform a review operation, or to enable the removal of the undesirable material from the substrate.

The movable final lens assembly 740 may travel in two directions relative to the optics block 700: (1) Z adjustment for focus of the final lens, and (2) either a second linear direction (such as X-direction) or a rotational direction (about the Z-axis) to enable (a) selection of any one of several final lenses for review or zap repair, or (b) selection of the direct write module and its dedicated final lens. A variety of different magnifications and/or match between optics component material properties (such as transmission) and the operating wavelength (for example, IR/visible, UV or DUV) is provided for the review/cutting repair functions. The direct write final lens magnification is selected based on the desired transfer shape size, and its optical material specifications based on the transfer laser wavelength.

FIG. 7 shows one final lens 716 for review and/or zap repair and a second final lens 402 dedicated for direct write repair. The direct write module is shown as including a final lens 402, and a ribbon carriage assembly 724. Ribbon carriage assembly 724 includes a two-axis stage, with one axis in Z 720 and the second axis 722 that lies in the plane perpendicular to the beam axis 718 and adapted to enable motion in that plane relative to the laser. Ribbon carriage assembly 724 includes a mounting plate 722 attached to the second axis stage, and associated hardware to hold the ribbon 406. The second axis stage with mounting plate 722 ensures that an inked portion of the ribbon 406 is always available to the laser 702 for transfer. The Z-axis stage 720 within the ribbon carriage assembly performs several functions: (a) provide fine resolution Z-adjustment of the ribbon 406 relative to the final lens 402 and the receiving substrate 404, (b) lift the ribbon 406 to a safe height (home or park position) above the receiving substrate 404 whenever the tool is performing functions other than writing, and (c) move the ribbon 406 to a load/unload height whenever the ribbon needs to be changed.

Figure 8A:
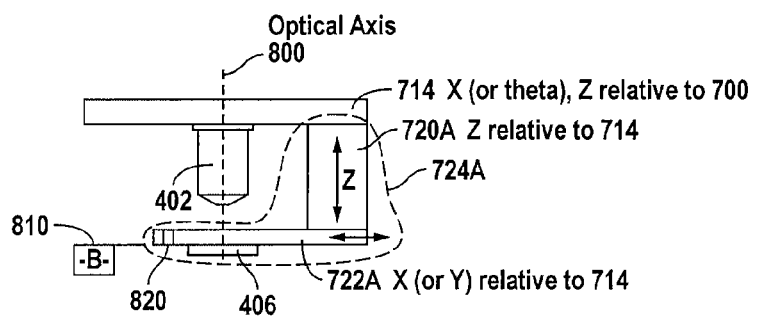
FIG. 8A illustrates various components of the movable final lens assembly and the direct write module of FIG. 7, in accordance with one embodiment of the present invention.

FIG. 8A illustrates the various components of the direct write module and movable final lens assembly, in accordance with one embodiment of the present invention. In this embodiment, the two axes of motion of the ribbon carriage assembly 724 are both linear: Z (720A) and either X or Y (722A). The X (or Y) stage 722A moves the ribbon relative to the direct write final lens 402 and therefore, relative to the laser 702, when the optical axis 800 of the final lens 402 is positioned coaxial with the laser beam path 718. Since the cure step requires that no untransferred ink material be in line of sight of the cure source 712 or the laser 702, the second axis stage must have a long enough stroke to reach clear hole 820 positioned within the ribbon mounting plate 722A. The Z-stroke range of the ribbon mounting plate 722 is constrained by the space between substrate 404 and the bottom of the final lens 402. In another embodiment, curing may be provided through an un-inked portion of the ribbon, assuming the ribbon is transparent to the wavelength used for curing.

Figure 8B:
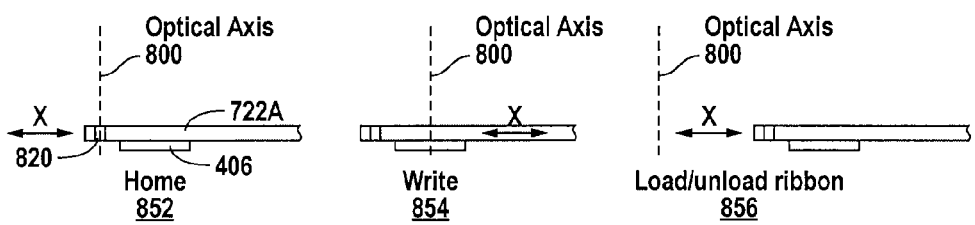
FIG. 8B shows three linear X positions for the ribbon relative to the optical axis of the final lens for of the movable final lens assembly.
Figure 8C:
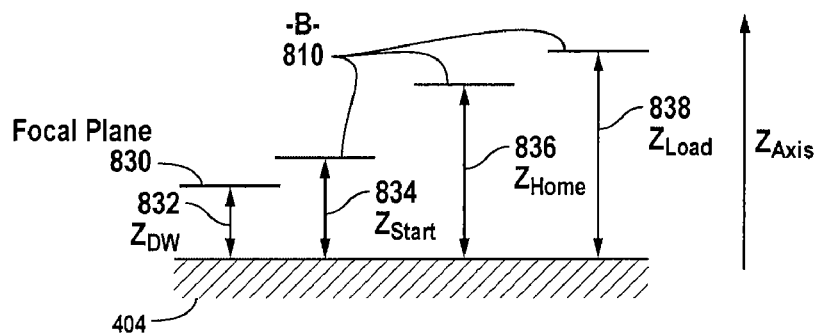
FIG. 8C shows critical Z positions for the ribbon relative to the receiving substrate.

FIGS. 8B and 8C show several key positions of the ribbon mounting plate 722 along X and Z directions respectively. In FIG. 8B, "home" position 852 is used for alignment of the clear hole 820 on the final lens optical axis 718; the "write" position 854 is used to place the ribbon in the optical axis 718. In the "load/unload" position 856, the ribbon is moved far from the optical axis. In FIG. 8C, $Z_{Home}$ 836 represents the home position in the Z direction. The position $Z_{Load}$ 838 is shown as higher than $Z_{Home}$ as merely an example, but may be the same as $Z_{Home}$ and has only the constraint that there be sufficient clearance from the final lens and the substrate to replace the ribbon 406. The position $Z_{start}$ 834 is a nominal height of the lower surface 810 of the ribbon mounting plate 722 that is close to the focal plane of the final lens 830. During writing, the ink/ribbon interface (424 in FIG. 4C) must be positioned at the focal plane 830 at height $Z_{dw}$ 832. The process to set up position at the focal plane is described below.

Figure 8D:
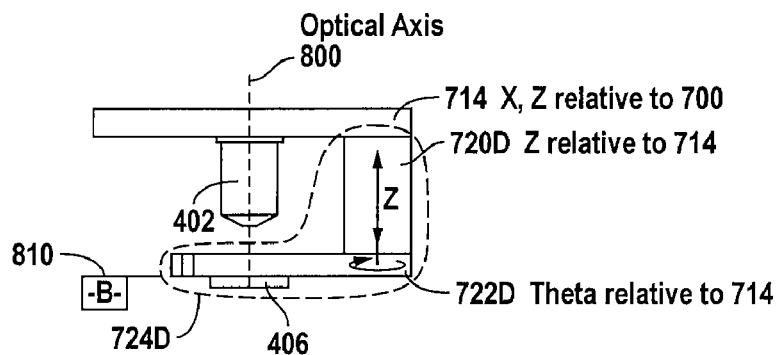
FIG. 8D illustrates various components of the movable final lens assembly and the direct write module of FIG. 7, in accordance with one embodiment of the present invention.
Figure 8E:
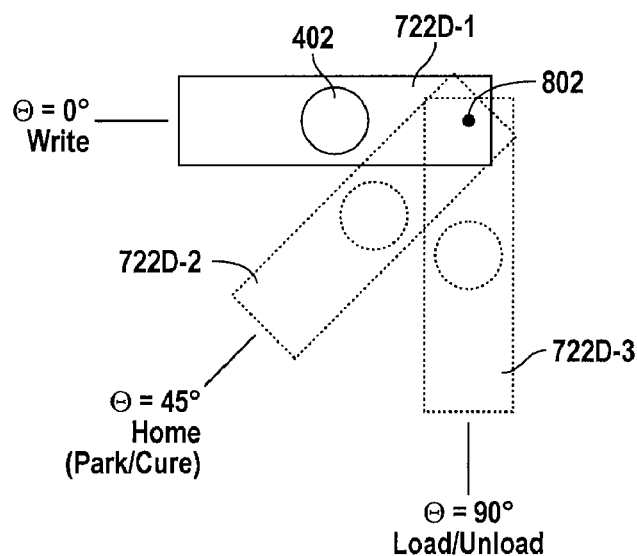
FIG. 8E shows three rotational (theta, Θ) positions for the ribbon relative to the optical axis of the final lens for the embodiment of FIG. 8D.

FIG. 8D is a side view of components of the direct write module and movable final lens assembly, in accordance with another embodiment of the present invention. FIG. 8E shows several key rotational positions for the embodiment of FIG. 8D. One axis of motion is in Z (720D), while the second axis of motion (722D) is rotationally around the Z axis. The home (park/cure) theta position (722D-2) is shown at 45° from the write position, but may be any angle that provides suitable clearance from the beam path 718 and final lens 402. The load/unload theta position (722D-3) may be the same as the home position, or it may be different as illustrated in FIG. 8E. The write theta position (722D-1) places the ribbon below the final lens 402 along the optical beam path 718.

The Z positions shown in FIG. 8C also apply to the embodiment of FIG. 8D. The embodiment of FIG. 8D has several advantages over the embodiment of FIG. 8A. First, the amount of rotational stroke to move the ribbon mounting plate relative to the beam path for writing can be relatively short. For example, if the pivot point 802 in FIG. 8E is 25 mm from the writing position, travel through an angle of 3° can provide greater than 1 mm total writing length, which may accommodate up to five defect repairs, if each repair requires 200 micrometers of writing length. Second, the ribbon mounting plate 722D may be moved fully away from the optics, for example to position 722B-3 in FIG. 8E, so that the Z-stroke for load/unload is no longer constrained by the final lens 402, thus enabling reasonably large clearances for load/unload of the ribbon. Therefore, for the embodiment of FIG. 8D that uses a rotational stage, total rotational stroke may be less than or equal to 180 degrees to provide three functions, namely write, home, load/unload. One embodiment may require-less than or equal to 90 degrees of total stroke to achieve write/home/load-unload functions. The shorter the total stroke, the shorter the times required to move from one position to another. One embodiment of the present invention using a rotational stage, such as that shown in FIG. 8D, may provide writing functions with high resolution within a range of less than about 15 degrees. Home and load/unload positions may be any positions greater than about 15 degrees as long as the beam path is cleared.

The embodiments shown in FIGS. 8A and 8D describe two axes of motion for the direct write module. In some other embodiments, a third axis of motion, for example, three linear axes X, Y, Z, may be used.

Figure 16A:
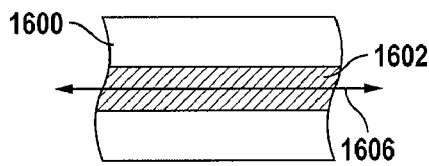
FIGS. 16A and 16B are top views of an inked ribbon showing directions of motion relative to the laser beam for the two embodiments illustrated in FIG. 8A and FIG. 8D, respectively.
Figure 16B:
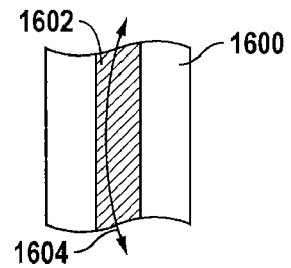

FIGS. 16A and 16B illustrate possible writing paths (1606 and 1604) of ribbon 1600 for the embodiment of FIG. 8A adapted for movement along a linear axis, and for embodiment of FIG. 8D adapted for movement along a rotational-axis, respectively. The inked portions 1602 of the ribbon 1600 may be long slots as shown in the figures, or may be square, rectangular, round or any shaped area. In FIG. 16B, the length of the inked portion 602 is shown as being substantially parallel to the arc motion 1604, but if the width of the inked portion 602 is wide enough, the length may be oriented to be substantially perpendicular to the direction of motion. Since only an unused portion of inked ribbon is presented to the laser for transfer, it does not matter whether the motion of the ribbon relative to the laser is linear or rotational, as long as the total length of lines to be written per ribbon are short compared to the dimensions of the ribbon and inked area of ribbon. It is desirable to use a ribbon for several defect repairs before exchange of the ribbon off-board, as shown in FIG. 5, or preparing a newly inked section on-demand, as shown in FIG. 6. Therefore, if, for example, typical line lengths per defect are approximately 50 to 150 micrometers long, then practical dimensions of an inked area should be at least, for example, five to ten times the average repair length per defect, or at least one to two millimeters.

Because the direct write function has a relatively low duty cycle, it may be desirable to protect the inked surfaces of the ribbon from damage or contamination when not in use. One embodiment may return the ribbon to its storage container, but this adds the time to load, unload, and set up each time the ribbon is required to write and thus may impact the overall throughput. Another embodiment may raise the ribbon to its home position and then place a movable cover 1802 over the inked portion as illustrated in FIG. 18A. This requires an additional mechanism 1804 to move the cover to the ribbon. A third embodiment may position the ribbon 406 using the existing two axes, 720 and 722, over a stationary shelf 1806 as illustrated in FIGS. 18B and 18C. In this example, the shelf is located at the home position, and the ribbon 406 is first moved from its write height $Z_{dw}$ 832 to a height H1 above the shelf (shown as step A in FIG. 18B) then rotated along the axis of rotation 722 (or moved linearly) from the write axes to the home position (shown as step B) over the shelf 1806, and then finally lowered to approximately height $Z_{home}$ onto the shelf 1806, which acts as a protective cover, as shown in FIG. 18C. FIG. 18D is a top view of ribbon 402 along its rotational path above cover 1806. In one embodiment, the temperature of the protective cover 1806 is controlled so as to provide a thermally controlled environment to the parked ribbon 406. Alternatively, or in combination with temperature control, a recess for the inked portion of the ribbon may be included in the shelf, so as to provide a microenvironment for the ribbon, similar to what the larger storage container 510 provides.

Figure 9:
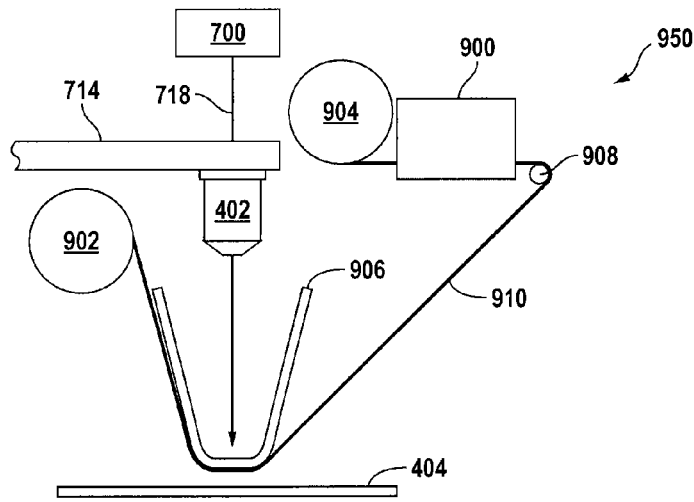
FIG. 9 is an on-demand ribbon assembly, in accordance with one embodiment of the present invention.

FIG. 9 illustrates one embodiment of an on-demand ribbon assembly 950. The ribbon 910 may be a flexible plastic material, for example, and be pulled from supply reel 904 by a take-up reel 902. The ribbon tape passes through a ribbon preparation module 900, and rides under it as the ribbon 910 is guided by a transparent "print head" 906. The optics/beam path 718 of optics module 700 is substantially coaxial to and passes through the final lens 402. The beam path 718 passes through the transparent print head 906 and ribbon 910 to transfer the ink/rheological material to the target structures (not shown) formed on receiving substrate 404. The assembly that includes the ribbon and reels, and the ribbon preparation module 900 may be combined into a replaceable cartridge 620 as shown in FIG. 6. In some embodiments, the ribbon preparation module 900 may itself be a cartridge and may be separately replaceable from the ribbon and reels.

Figure 10:
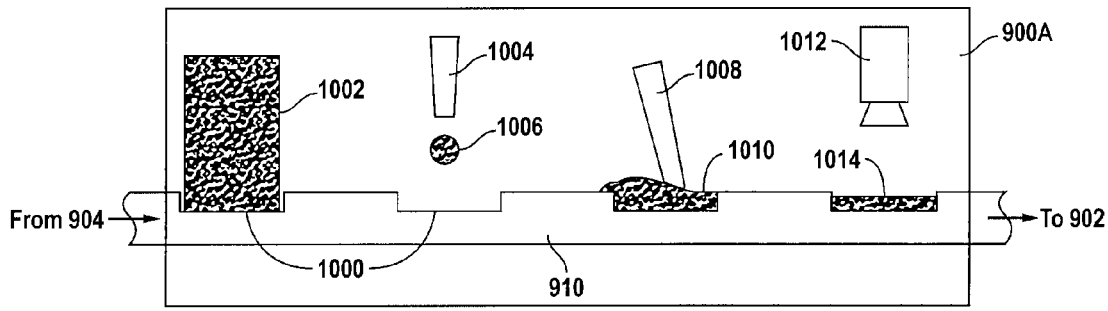
FIG. 10 shows various components of the ribbon preparation module of FIG. 9, in accordance with one embodiment of the present invention.

FIG. 10 shows various components of ribbon preparation module 900A for an on-demand ribbon assembly of FIG. 9, in accordance with one embodiment of the present invention. The ribbon preparation is a multi-step process, and the ribbon is shown as moving from left to right. A laser beam 1002 may ablate a recess 1000 in the ribbon. The recess may be any shape, rectangular, round, etc., and formed to the required depth (depth 420 in FIG. 4C) for optimum transfer, less than several micrometers deep in some embodiments. Then, the ink material 1006 is deposited in the recess 1000 by an ink dispenser 1004. As the ribbon moves under a doctor blade 1008, the ink 1010 is leveled within the recess and any excess is removed. An optional inspection step may be included in which a camera 1012 visually inspects the ribbon with leveled ink 1014. The prepared section of the ribbon then continues within the ribbon cartridge, passing over rolling pin 908 (see FIG. 9) thus inverting the ribbon so that the inked portion faces the receiving substrate 404. In some embodiments, the ribbon preparation module 900A may be inverted to eliminate the need for inverting the ribbon prepared by the arrangement of the components shown in FIG. 9. In some embodiments, for example, ink dispenser 1004 may be a conventional inkjet head, or an aerosol jet head as described in U.S. Pat. No. 7,108,894, and available from Optomec, Inc. under product name M³D. In some embodiments, the laser beam 1002 may be directed from repair laser 702 and its optics 704. In some embodiments, the laser beam 1002 may be provided by a suitable separate additional laser. In other embodiments, the imaging camera 1012 may be the same as imaging block 708, while in some embodiments camera 1012 may be a suitable separate additional camera.

Figure 11A:
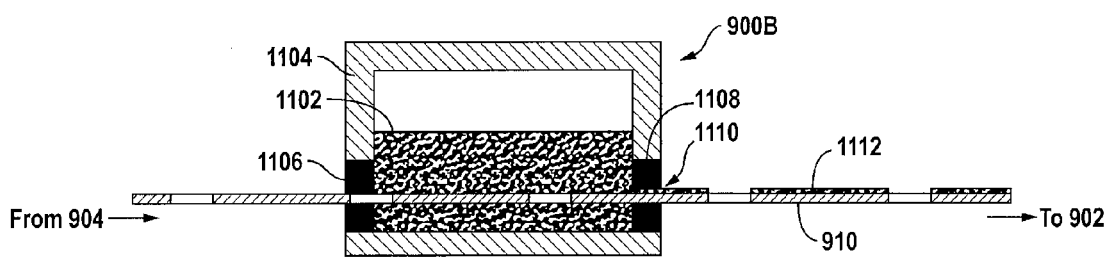
FIGS. 11A and 11B are side and top view of components of the ribbon preparation module of FIG. 9, in accordance with another embodiment of the present invention.
Figure 11B:
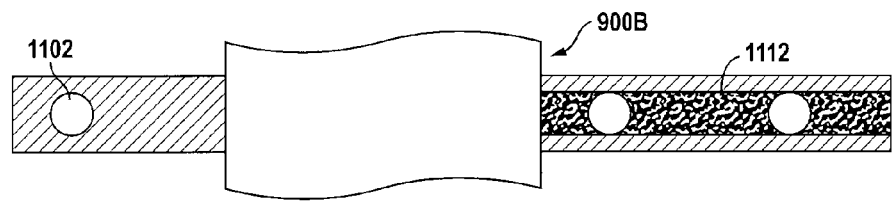

FIGS. 11A and 11B are side and top views of various components of a ribbon preparation module 900B for an on-demand ribbon assembly, in accordance with another embodiment of the present invention. A slot coat methodology is applied. Specifically, ribbon 910 is pulled by take-up reel 902 through a container 1104 that has a reservoir of ink/rheological material 1102. The container is sealed at the entrance around the ribbon by a gasket or seal 1106. The container outlet also includes a gasket or seal 1108, but with a slot 1110 of height equivalent to the desired ink thickness, e.g., 0.1 to 5 micrometers high in one embodiment. As the ribbon 910 is pulled by take-up reel 902 through the ink reservoir, ink passes through the slot and is leveled by the slot to the desired thickness 1112. A slight amount of pressure may be applied within the ink container 1104 to press the ink outward. In the embodiment shown in FIGS. 11A and 11B, the ribbon includes through-holes 1120 positioned periodically along its length. These holes allow direct line of sight of the transferred material by the laser curing beam. In some embodiments, the holes may be pre-made in the ribbon prior to assembly onto the supply reel 904. In other embodiments, the holes may be made by laser ablation or mechanical stamping, cutting, etc. within the ribbon preparation module 900B. The through-hole feature shown in FIGS. 11A and 11B and methods of creation of the feature may also be included in embodiment 900A of FIG. 10.

FIG. 12A shows an on-demand ribbon assembly 950, in accordance with another embodiment of the present invention. This embodiment includes a transparent print head 1202 that contains a recessed slot or channel 1210 on the supply side. FIG. 12B shows the ribbon 910 in the channel 1210 in cross section A-A. As shown in exploded detailed view FIG. 12F, a supply module 1204 with a reservoir of ink/rheological material 1206 is positioned so that its slotted outlet lies against the print head 1202 and ribbon 910. A slight amount of pressure may be applied to ensure that the ink passes out of the supply module. A doctor blade 1208 presses against the print head at the trailing edge of the ink supply module, and levels the ink as the ribbon passes by. FIG. 12C is sectional view B-B of ribbon preparation module 900C at the ink application plane. FIG. 12D is sectional view C-C of ribbon preparation module 900C at the doctor blade plane. Vacuum or pressure through the hole 1220 located on the backside of the ribbon may be included in some embodiments to control ink delivery. Such a vacuum pulls the ribbon flush against the bottom of the channel 1210. Ink can then flow as shown in FIG. 12C. Such a pressure pushes the ribbon flush against the doctor blade 1208 and ink reservoir, thus prohibiting ink to remain on the ribbon. FIG. 12E illustrates the completed ribbon that is presented to the laser beam 718 for transfer to receiving substrate 404. The through-hole feature shown in FIG. 11 and methods of creation of the feature may also be included in the embodiment of FIG. 12A.

Figure 13A:
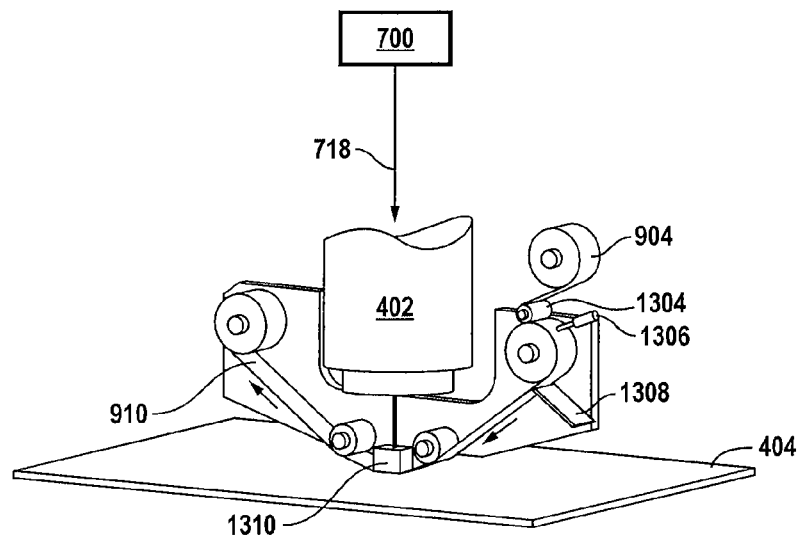
FIGS. 13A-13C are several views of an on-demand ribbon assembly, in accordance with another embodiment of the present invention.
Figure 13B:
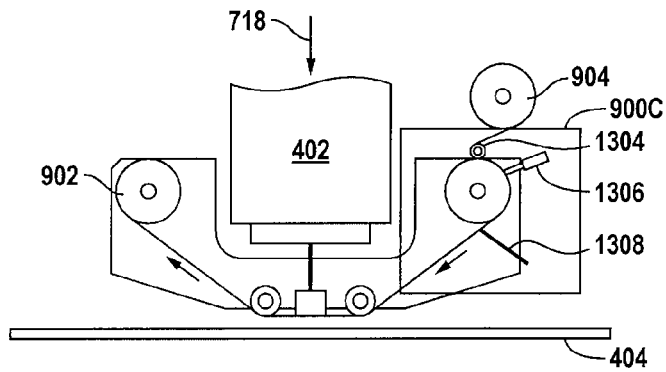
Figure 13C:
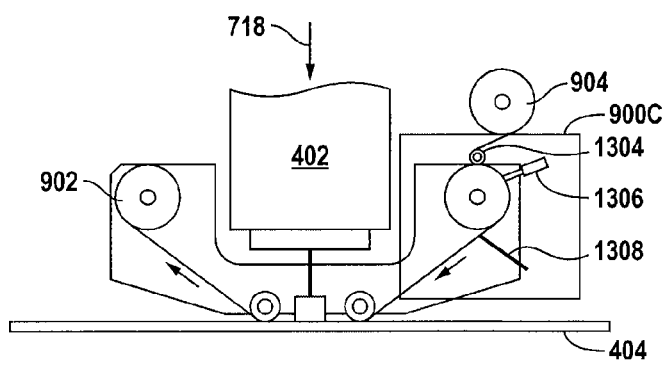

FIG. 13A is a perspective view of an on-demand ribbon assembly 1300, in accordance with another embodiment of the present invention. FIGS. 13B and 13C are side views of on-demand ribbon assembly 1300 with its ribbon guide positioned in the up and down directions respectively. Referring concurrently to FIGS. 13A-13C, ribbon preparation module 900C is a direct print medium mechanism that includes a "well-making" mechanism and a dispenser of ink/rheological material. The supply 904 of laser-transparent target ribbon material 910 is fed into the well-making mechanism 1304 which embosses a rectangular profile shallow well (as shown in FIG. 4C) along the length of the target ribbon material 910. As the embossed ribbon is fed past the ink/dispenser 1306, ink/rheological material is applied by ink/dispenser 1306 to the embossed ribbon.

On the output side of the dispenser 1306 is a doctor blade 1308 which smoothes the ink and removes any excess from the target surface. The result is a ribbon containing a shallow recessed well filled with the rheological material of uniform thickness. The ribbon is then guided towards the receiving substrate 404 by guide 1310. Laser beam 718 is focused by the final lens 402 onto the rheological material to transfer the rheological material to the receiving substrate 404. In some embodiments, guide 1310 may be adjusted to allow the ribbon to ride at a fixed gap above the receiving substrate 404 during the writing process, as shown in FIG. 13B. In other embodiments, the guide 1310 may be adjusted to allow the ribbon to contact the receiving substrate 404 during the writing process. When writing is completed, the ribbon is lifted by guide 1310.

There are a number of commonalities among the many embodiments of anon-demand ribbon preparation assembly, shown in FIGS. 9 through 13. The ribbon 910 must be optically transparent to the laser wavelength for material transfer, and if no hole 1120 is provided, should also be optically transparent to the laser cure wavelength. The ribbon 910 should be flexible enough to enable storage of a supply and of used material, as shown for example in a reel-to-reel arrangements 902 and 904. Materials such as glass, or plastics (for example, Mylar™ or polycarbonate) have satisfactory optical properties and may be formed thinly enough to be flexible for handling and storage. The ribbon may typically have cross-section profile dimensions 50 micrometers to 250 micrometers thick, and approximately 2 mm to 10 mm wide, in some embodiments. Its length needs to be sufficient to thread through the apparatus, and further provide enough writing material to accommodate at least, for example, several weeks' worth of defect repairs. If typical line lengths per defect repair are approximately 50 to 100 micrometers, then a 1 meter ribbon length may provide as much as 10,000 repairs. The print head, 906 in FIG. 9, and 1202 in FIG. 12, must be either optically transparent to the laser transfer wavelength, or have a through hole through which the beam may pass. The print head may include a shallow channel to guide the ribbon as the ribbon travels along its surface. The form of the print head is not limited to those illustrated in FIGS. 9 and 12. Further, in some embodiments of the invention, the on-demand preparation modules may incorporate proper control of environmental parameters such as temperature, humidity, pressure, and so forth in order to maintain proper material composition.

The ribbons prepared off-board of the system have nearly all the same requirements as those prepared on an on-demand basis. These may be individual ribbons that are periodically, either per flat panel (FP) or per several FP substrates, loaded onto and then unloaded from the direct write assembly. The ribbons therefore must have suitable stiffness for automatic handling. The ribbons prepared off-board may otherwise have any shape (for example, rectangle or round) with size set by the automatic load/unload handling requirements and requirements for automatic ink application. In some embodiments, the ribbons may be on the order of tens of millimeters in length and breadth, and have thickness of a few tenths of millimeters or more.

The ribbons prepared off-board may be prepared by an apparatus similar to one used for on-demand ribbon preparation. That is, off-board ribbons may have recessed wells created through ablation using a laser or by way of embossing. Recessed wells may also be etched into off-board ribbons. Further, the rheological materials may be applied to the off-board ribbons using slot coating or doctor blading or spin-on techniques.

The embodiments of the direct write module and movable final lens assembly shown in FIGS. 8A and 8D may use a ribbon having form similar to that shown in FIG. 4C and being prepared off-board of the tool, as shown, for example, in FIG. 5A. The same motions, i.e., minimum of 2 axes with one axis of motion in the Z direction, that are described in FIGS. 8A through 8E are also used for an on-board on-demand ribbon assembly, as shown, for example, in FIG. 6. In particular, as described in FIGS. 8A through 8E, on-demand ribbon preparation modules are mounted on a dual axis stage, namely Z and either X/Y or theta. Means to set the gap between an on-demand ribbon assembly and the substrate surface may be the same as an off-board ribbon, as was with reference to FIG. 4A. Further, as in the case of an off-board prepared ribbon, the on-demand ribbon must be parked at a safe height above the substrate surface when not writing. As with the off-board prepared ribbon, the autofocus module with feedback to the controller of the Z-stage 720 may be used to maintain focus on the on-demand ribbon ink/ribbon interface plane during writing.

Figure 14:
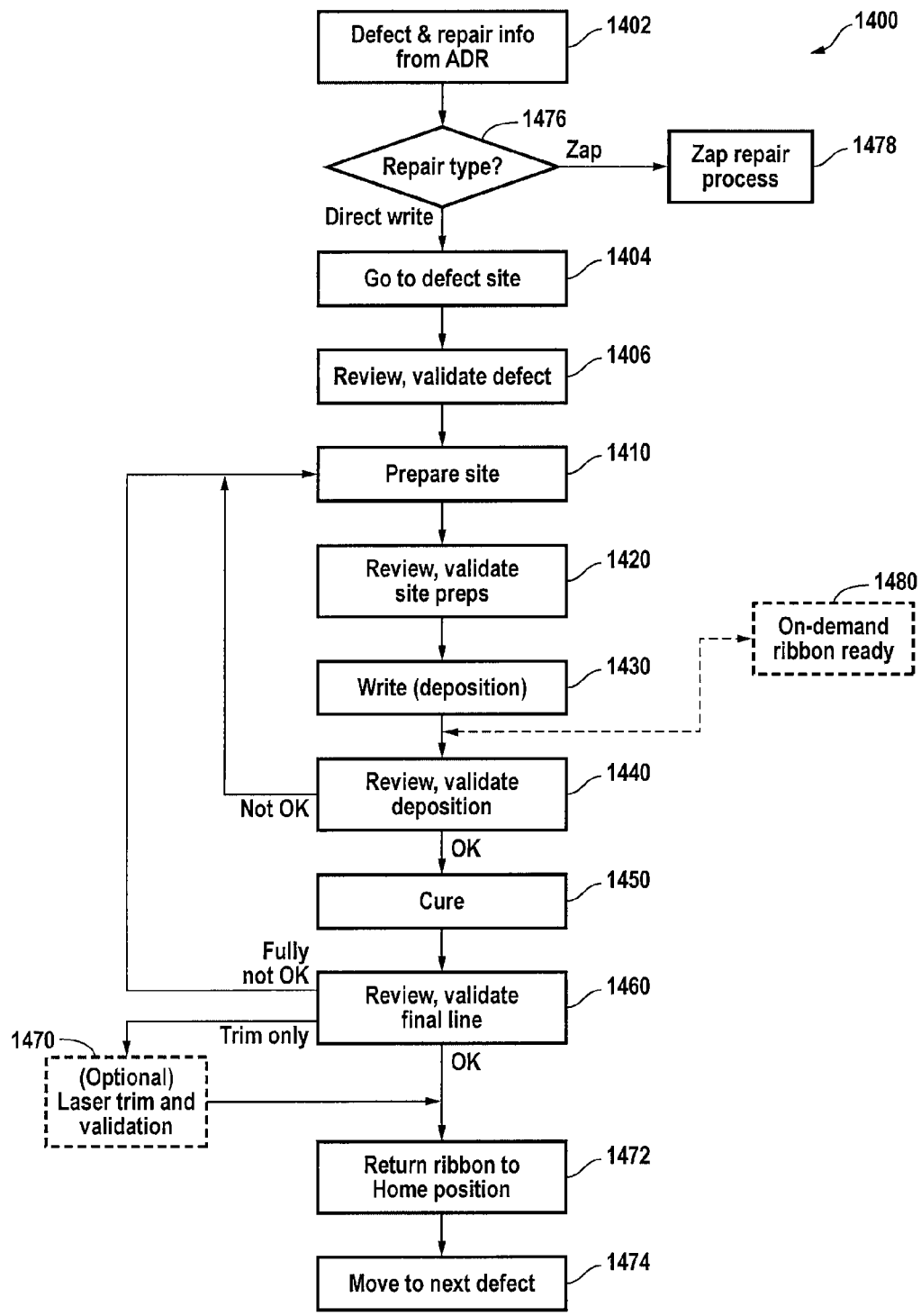
FIG. 14 is a flowchart of steps carried out to perform direct write repair of a defect, in accordance with one embodiment of the present invention.

FIG. 14 is a flowchart 1455 of steps carried out to perform direct write repair of a defect, in accordance with one embodiment of the present invention. FIGS. 15A through 15E provide more detailed description of a number of steps of flowchart 1455. The modules of FIG. 7 and the positions described in FIG. 8A through 8F are referred to concurrently in the explanations below. At the start of the process, step 1402, information for the defect to be repaired is provided to the tool through electrical testing or automatic optical inspection (AOI) or during a defect review of inputs from electrical test or AOI. At step 1476, the repair types are sorted into zap repair or direct write deposition repair. The zap repair process 1478 is not described further below. In the next step of the direct write process, the optics payload is moved to the defect of interest, step 1404. Then at step 1406, the defect to be repaired is verified using the review final lens 716 in FIG. 7. At Step 1410, the defect site preparation may include removal of material using the laser 702 in the "zap" function. The material removal process may consist of drilling vias, for example, five micrometers diameter to depths of several micrometers, through one or more layers, or clearing larger areas, for example, slotted shapes slightly larger than the line feature to be written, e.g., 10 micrometers wide by the length of the feature. The vias may be tapered, with the smaller diameter at the bottom of the hole, or have a constant diameter along their entire length. The operator may review the results of site preparation by invoking step 1420. Once the defect site is prepared and deemed acceptable, the write operation 1430 may be executed. If the system configuration includes an on-demand ribbon preparation 1480, as illustrated in FIG. 6, the ribbon is inked and ready before step 1430 begins. Once the transferred line pattern is completed in step 1430, then the operator may optionally review and validate the deposition at step 1440. If the transferred line pattern is not acceptable, the process may return to step 1410, during which the transferred line pattern is removed or trimmed through the site preparation operation. Once the transferred line pattern is acceptable, then it is cured at step 1450. Following the curing of the transferred line pattern, the operator again has the option of reviewing the cured transferred line pattern at step 1460. If the repair is fully unacceptable, the operator may choose to start again with the site preparation step 1410 and strip the repair fully or in part using the zap laser 702, and then re-do the repair by repeating steps 1430 through 1450. Alternatively, if the repair merely requires trimming, the operator may choose to employ the zap laser to trim any excess and then validate the results at step 1470. If the repair is acceptable, the system returns the ribbon to its home position at step 1472, and then moves to the next defect to be repaired at step 1474.

Figure 1:
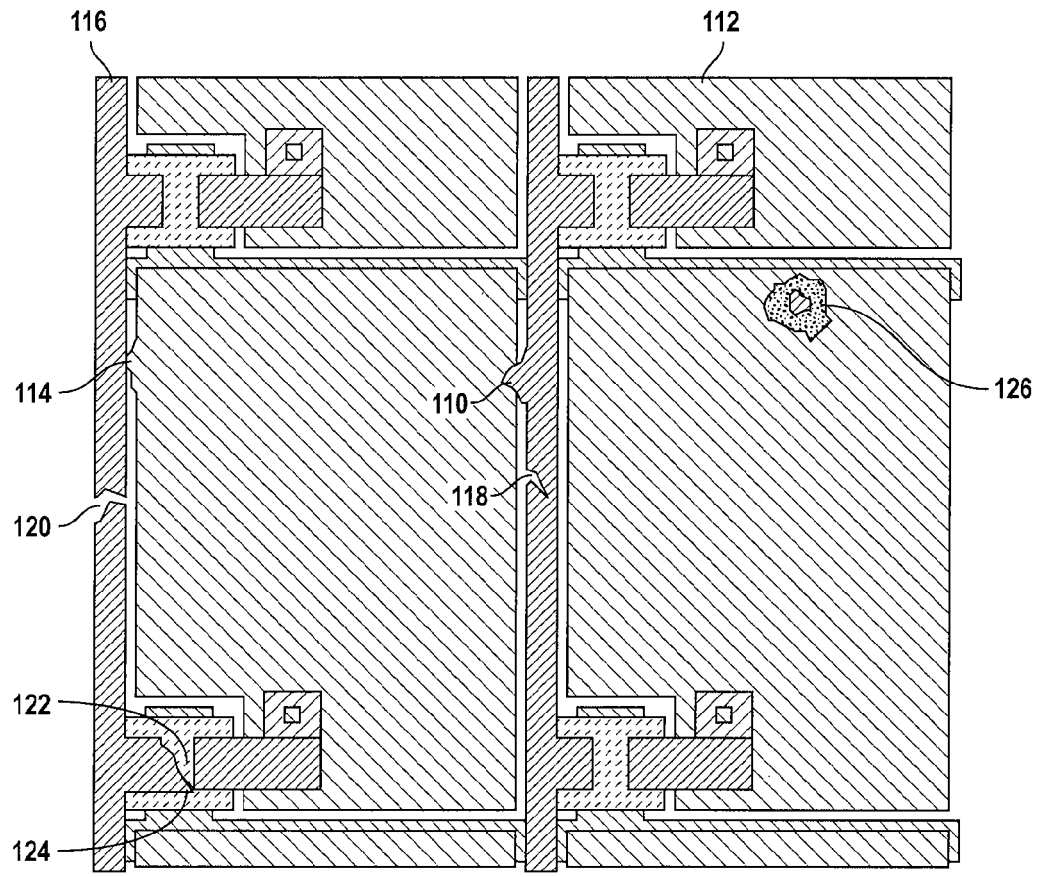
FIG. 1 shows a number of non-periodic defects in a top view of a portion of a large flat patterned medium with periodic transistor arrays, as known in the prior art.
Figure 15A:
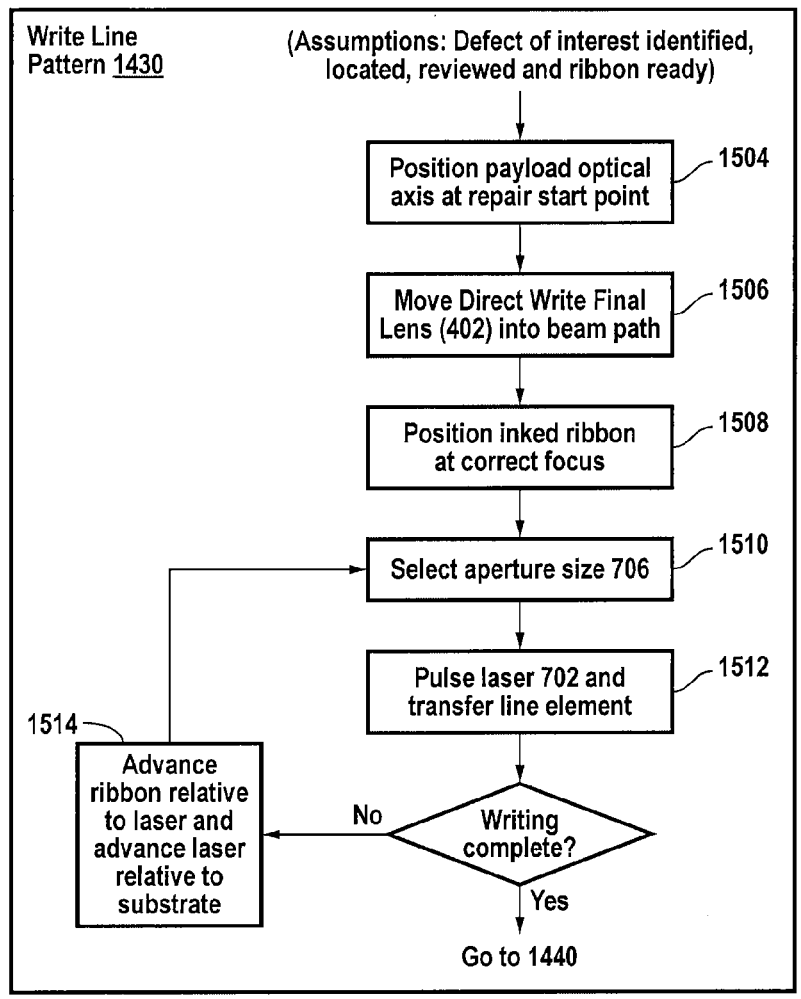
FIGS. 15A-15E provide more detailed descriptions of a number of steps associated with the flowchart of FIG. 14

FIG. 15A is a flowchart of steps carried out during the write (deposition) step 1430 of FIG. 14. Writing step 1430 is not invoked until the defect has been reviewed, the defect site has been prepared and reviewed, and in the embodiment using an on-demand ribbon, the ribbon preparations are completed. Further, it is assumed that the repair parameters such as defect location, defect type, dimensional parameters, line element sizes, and so forth have already been entered into the tool data set. Then, at step 1504, the beam axis is positioned at the repair start point by moving the payload, 550 or 650, with respect to the substrate. At step 1506, the direct write final lens optical axis 800 is shifted to be coaxial with the beam axis 718, and therefore the direct write final lens 402 and the associated direct write apparatus are shifted into the beam path 718. At this point, the inked ribbon still remains in its home position, at a height $Z_{home}$ 836, and in some embodiments at $X_{home}$ or $Theta_{home}$, e.g., position 852 in FIG. 8B or 722D-2 in FIG. 8E. $Z_{home}$ 836 is a safe gap height above the substrate. During Step 1508, the inked ribbon is moved in X (or Y) or Theta to the write position, e.g. 854 in FIG. 8B or 722D-1 in FIG. 8E, and is adjusted in Z to place the ink/ribbon interface plane at the focal plane 830 of the direct write final lens 402. The autofocus assembly (710) is used to detect the final lens focal point as the ribbon is moved in Z. The details of focusing step 1508 are described below. With the final lens focused correctly on the ink/ribbon interface 830 and with the beam path positioned at the repair starting point, the direct write transfer begins. At step 1510, the desired aperture size 706 for the first element of the line to be written is selected per the repair recipe definitions of step 1402. Then, the laser 702 is pulsed to transfer the first element of the line to be written. If writing is not complete, ribbon 406 is advanced relative to the laser via motion device 722 in FIG. 7 to an inked area, and the payload/laser 550 or 650 is advanced relative to the substrate to the next location at step 1514. The aperture size is set according to the entered repair parameters, and then the laser is pulsed to transfer the next element. The loop continues until the write operation is completed.

Figure 15B:
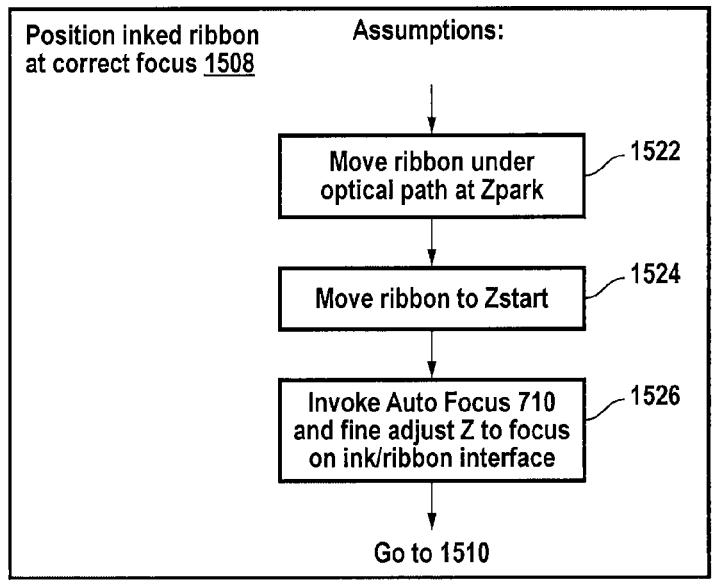

FIG. 15B is a flowchart of steps associated with focusing the ink/ribbon interface step 1508 of the flowchart shown in FIG. 15A. At step 1522, the inked ribbon is moved from its home X (or Y) or Theta position, e.g., 852 in FIG. 8B or 722D-2 in FIG. 8E, to the X (or Y) or Theta Write position, e.g., 854 in FIG. 8B or 722D-1 in FIG. 8E, while maintaining the $Z_{home}$ gap height 836. Once in the $X_{dw}$ or $Theta_{dw}$ position, the ribbon is moved to $Z_{start}$ position 834 at step 1524. $Z_{start}$ is shown in FIG. 8C, and may be any system (or user) defined height that is well within clearance distance from the substrate, and more specifically, may be the height of a plane above the substrate surface that is near the ink/ribbon interface plane, e.g., 424 in FIG. 4C. The next step 1526 invokes the autofocus function 710, which feeds back a signal to the direct write assembly Z stage 720 directing the stage to finely adjust until the ink/ribbon interface plane 424 is in focus 830, that is, at Z position $Z_{dw}$ 832.

Figure 15C:
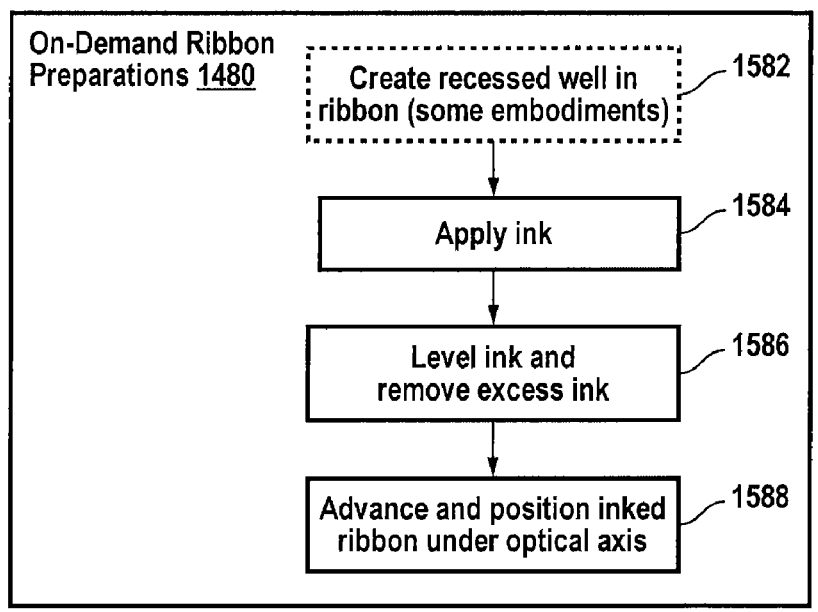

An alternate embodiment of the process flow described in FIG. 14 may include a branch for on-demand ribbon preparation 1480. FIG. 15C illustrates the details of an on-demand ribbon preparation process flow. The on-demand preparations may occur in parallel to at least the initial steps of the write process 1400, or may occur as soon as a direct write defect repair is known to be required. More specifically, the on-demand preparations must be completed in time before the ribbon is required at Step 1430. The on-demand ribbon preparation process steps 1480 apply to any one of the on-demand ribbon preparation embodiments described in reference to FIGS. 9, 10, 13. For on-demand ribbon preparation embodiments such as those shown in FIGS. 11, 12, the first process step 1582, namely creation of recessed well, does not apply since these embodiments use techniques that do not require recessed wells. The process for on-demand ribbon preparation is as follows. First, a recessed well is created at step 1582 by, for example, ablation or embossing. Then ink/rheological material is applied at step 1584, followed by a smoothing or leveling to the desired thickness. Next, the excess material is removed by way of slot coat or doctor blading techniques at step 1586. The prepared section of ribbon is then advanced and positioned into the optical axis at step 1588.

Figure 15D:
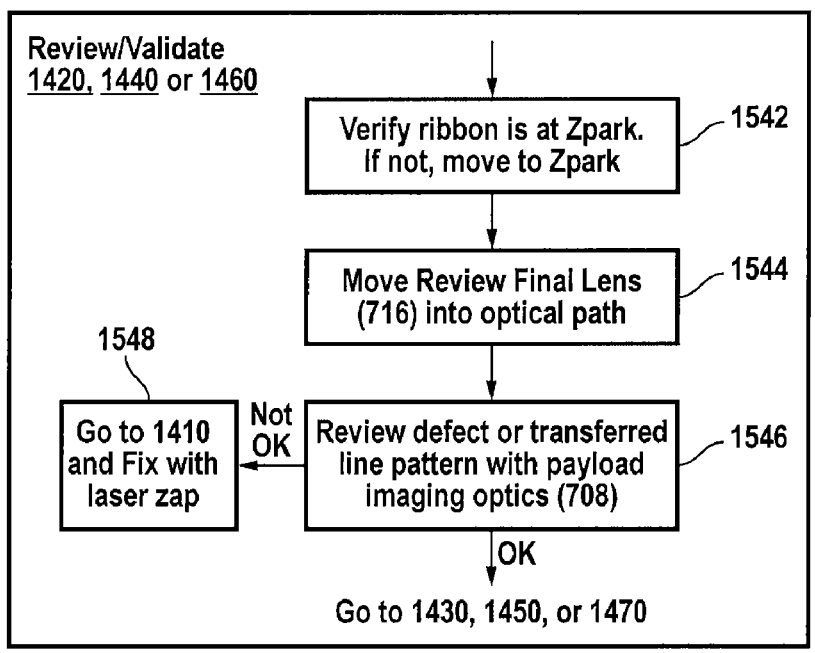

FIG. 15D is a flowchart providing more details associated with validating the site preparation 1420, validating the transferred line pattern 1440, or validating the cured transferred line pattern 1460 steps of FIG. 14. In any of these operations, the first step 1542 of the validation process is to ensure that the ribbon is at a safe height above the substrate, specifically the ribbon should be at $Z_{home}$, 836 in FIG. 8C, and if not, should be moved to $Z_{home}$. Once the ribbon is in a safe position, step 1544 shifts the review final lens 716 optical axis to be coaxial with the beam/imaging axis 718 by moving the lens mounting plate 714 in FIG. 7. During step 1546, the transferred line may then be reviewed using the payload imaging block 708 while moving the payload, 550 or 650, in X and Y directions relative to the substrate along the transferred line. If the review is satisfactory, then the process flow shown in FIG. 14 continues. If the results of the review are unsatisfactory, the operator has the option of returning to step 1410 and making adjustments using the laser in a zap function at step 1548.

Figure 15E:
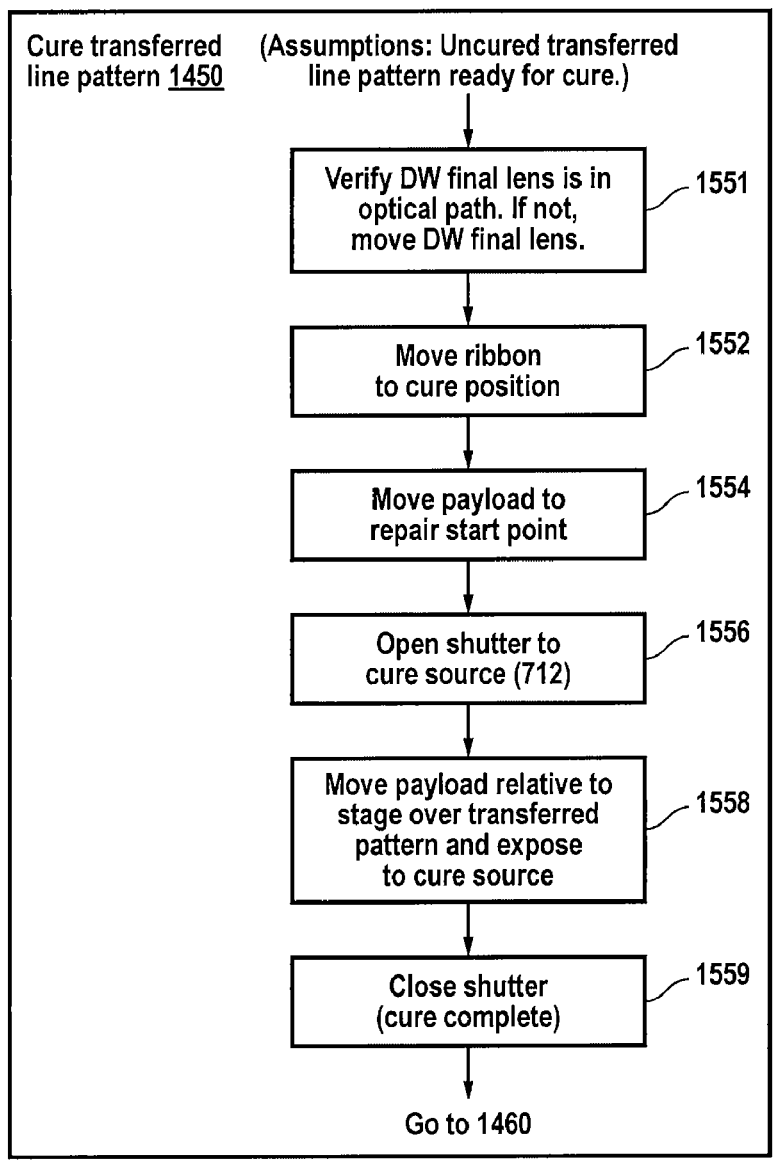

FIG. 15E is a flowchart providing more details associated with curing step 1450 of FIG. 14 of the transferred line pattern. The setup requires the direct write final lens 402 to be shifted, if necessary, so that its optical axis 800 is coaxial with the payload's beam axis 718, as shown in step 1551. In the next step 1552, the ribbon assembly is moved to its home position, for example, 852 in FIG. 8B, or 722D-2 in FIG. 8E. The home position as described above, allows a clear beam path to the transferred pattern on the substrate through an open hole, such as 820 or 1120, in the ribbon or by moving the ribbon and ribbon carriage plate fully out of the beam path. The payload, for example, 550 or 650 in FIG. 7, is moved to place the beam 718 at the repair's starting point coordinates, as shown in step 1554. In step 1556, the shutter to the cure source 712 is opened to begin exposing the transferred line to the cure source, for example, a laser, laser diode or other source of thermal energy. Another embodiment may turn the cure source on and off instead of using a shutter. The transferred line pattern is then cured by moving the payload/cure source, 550 or 650, relative to the stage and exposing the transferred line pattern to the cure source, as shown in step 1558. When the line is fully exposed to the cure source, the cure is considered complete and the shutter to the cure source is closed, or alternatively, the cure source is turned off, as shown in step 1559. The process may then proceed to step 1460 of FIG. 14.

The direct write apparatus, for example, any of those described in FIGS. 7, 8, 9, 10, 11, 12, 13 may be adapted for the preparation and transfer of more than one material with little to no time added to the process sequence and with little to no change in the apparatus motion mechanisms. Specifically, on-demand ribbons may include embossing means that provide parallel recessed wells such as illustrated in FIGS. 17A and 17B. Alternatively, on-demand ribbons may be ablated with shaped recessed wells such as that illustrated in FIG. 17C. Additional dispensers, having different ink/rheological materials, may be added to configurations such as those shown in FIGS. 10 and 13, and in these cases may be set up in parallel or serially. Additional slot coaters such as shown in FIG. 12 may be added in series, with the slots shifted relative to each other and positioned over specific well positions across the ribbon. For example, the slot of one slot coater of FIG. 12 may be positioned to fill one well, for example, 1702, of FIGS. 17A and 17B, while the slot of a second coater may be positioned to fill the second well 1704. Ribbons prepared off-board may be delivered with multiple recessed wells filled with different materials, as illustrated in FIGS. 17A, 17B, and 17C.

FIGS. 17A, 17B, and 17C also indicate examples of how two different materials, for example, those disposed in wells 1702 and 1704, may be easily accessed by the apparatus described in FIGS. 7 and 8 without increasing the complexity of the apparatus. FIG. 17A is an example of the orientation of the ribbon wells 1702 and 1704 relative to the linear path motion 1708 as provided by X-stage 722A of FIG. 8A. In this example, the X-stage merely moves from one material, for example 1702, to the next, for example 1704, when required. The recessed well width is greater than the typical length of repaired line patterns, for example, the recessed well width may be several millimeters wide. FIG. 17B is an example of the orientation of ribbon wells 1702 and 1704 relative to the arc path motion 1706 as provided by Theta-stage 722D of FIG. 8D. FIG. 17C is an example of the orientation of multiple recessed wells with two materials 1712 and 1714 forming an interleaved pattern and alternating in sequence relative to a linear path motion 1708 as provided by X-stage 722A of FIG. 8A. The ribbon with alternating materials, i.e., interleaved pattern, may also be used with Theta stage 722D by placing the wells substantially in line with the arc path. In other embodiments, the interleaved pattern may be formed by disposing N recessed wells containing material 1712 between M recessed wells containing material 1714, where M and N are any integers greater than 1.

Figure 2A:
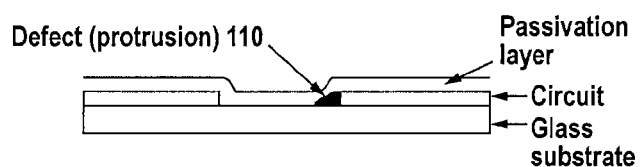
FIGS. 2A and 2B show cross sectional views of a device having a protrusion defect before and after repair, as known in the prior art.
Figure 2B:
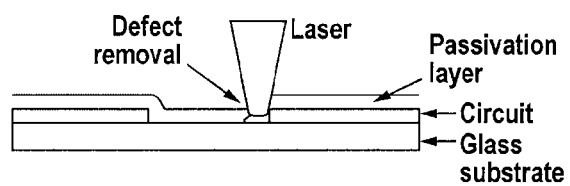
Figure 3A:
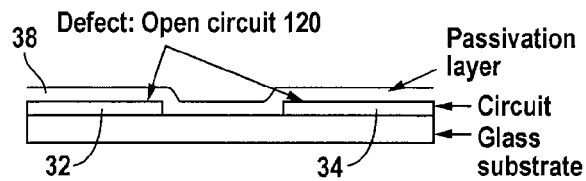
FIGS. 3A to 3E show cross sectional views of a device having an open circuit defect before and after repair, as known in the prior art.
Figure 3B:
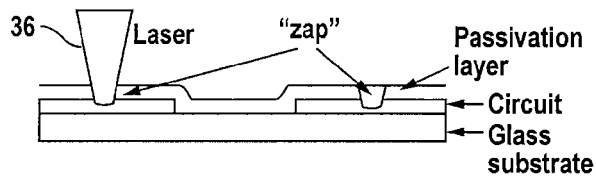
Figure 3C:
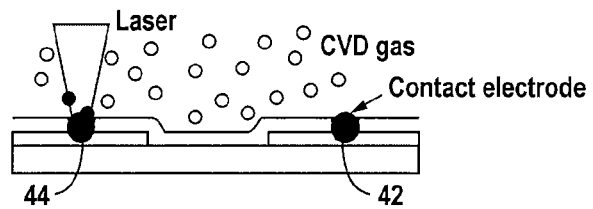
Figure 3D:
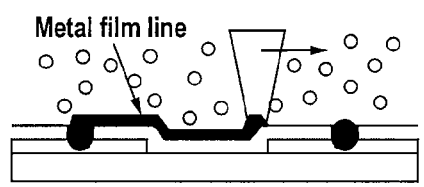
Figure 3E:
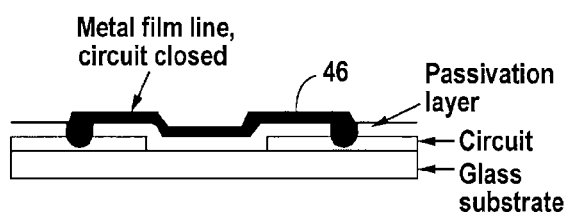
Figure 20A:
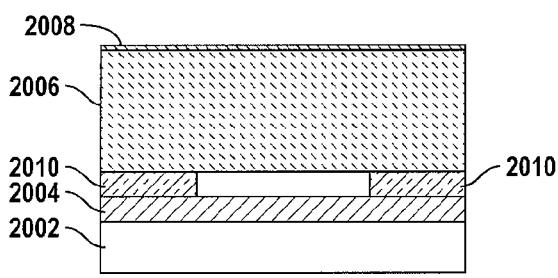
FIG. 20A is a cross section of an open data line with thick passivation layer under a pixel.
Figure 20B:
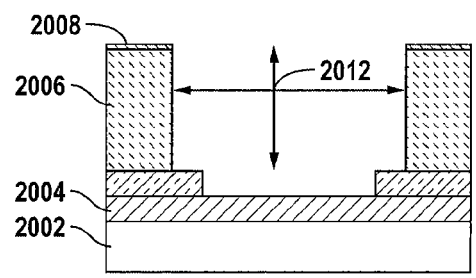
FIGS. 20B and 20C show the repair of the open data line of FIG. 20A using conventional methods.
Figure 20C:
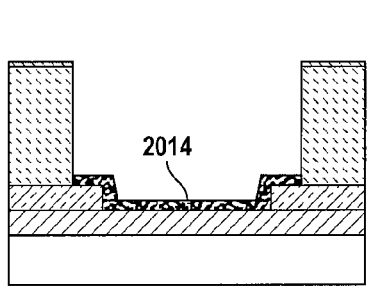
Figure 20D:
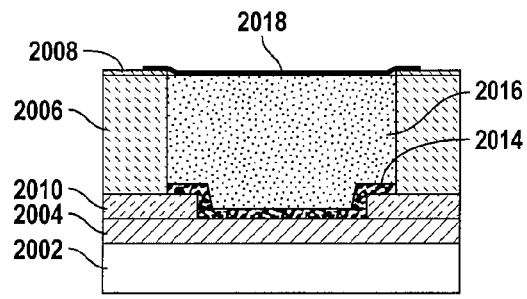
FIG. 20D shows completed repair of the open data line of FIG. 20A, in accordance with the present invention.

An apparatus and method as described above with capabilities accommodating more than one rheological material provides further advantage in repair of FPD panels and other applications with similar repair requirements, and also has advantage in general direct writing applications. FIG. 20A-20D illustrate a pixel requiring two materials, metal and non-metal, such as an organic passivation material, for repair. In FIG. 20A, an open data line defect 2010 lies on a gate insulator film such as SiNx 2004, which coats glass 2002. The open data line crosses under a pixel. The organic passivation layer 2006 is approximately 2 micrometers thick and is covered by pixel ITO layer 2008. The defect is discovered during array testing, after application of the organic passivation layer 2006 and pixel layer 2008. The repair using conventional deposition repair methods such as LCVD is illustrated in FIGS. 2B and 2C. In FIG. 2B, the conventional method using laser machining first removes the ITO layer 2008 and organic passivation layer 2006 above the open data line 2010. Then, as shown in FIG. 2C, the conventional method uses LCVD to repair the open data line 2010 with a repair line 2014. Because conventional methods such as LCVD can only repair with a single metal material, the organic layer 2006 over the repair line 2014 is not replaced. If the repaired open data line is below a pixel, the pixel will not function. The present invention, by using the laser transfer apparatus with ready access to more than one rheological material, however, may cover the repaired line by laser transfer of organic material 2016, as shown in FIG. 20D. Further, since the present invention has the capability of transferring at least two materials, the present invention may also transfer a second metal line 2018 to bridge the ITO layer. The full repair of not only the open data line defect, but also restoration of the organic passivation layer and ITO layer makes the affected pixel usable.

Figure 21A:
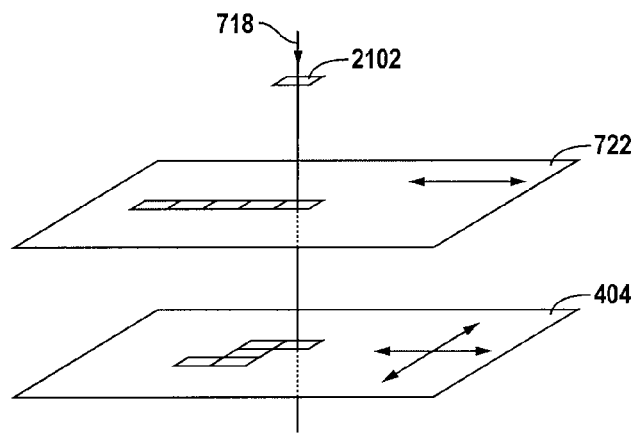
FIG. 21A is a schematic of the laser transfer apparatus with an inked ribbon moving per transfer line segment with respect to a beam shaping aperture centered on the beam axis and with a substrate moving in two axes relative to the beam.
Figure 21B:
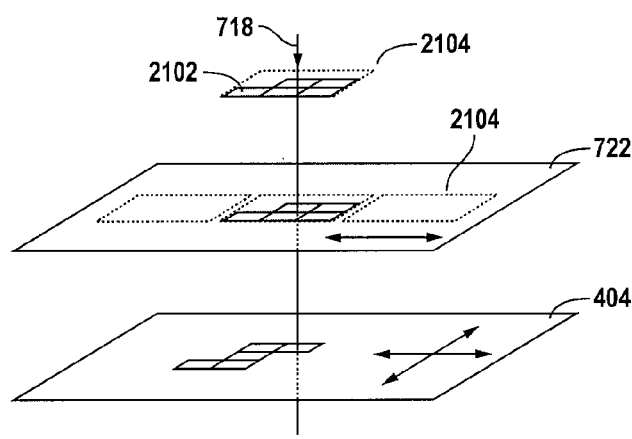
FIG. 21B is a schematic of another embodiment of the laser transfer apparatus with a beam aperture that is positioned within a maximum field of view, and an inked ribbon that moves in steps at least equal to the maximum field of view, and a substrate that moves in two axes relative to the beam.

In the embodiment of the invention shown in FIGS. 8A through 8E, the laser beam 718 remains centered in the field of view of the final lens 402, and the inked ribbon moves with respect to the beam. The beam may be shaped by the variable aperture 706, but the aperture remains centered about laser beam 718. FIG. 21A depicts the embodiment shown in FIGS. 8A through 8E, with the center of the aperture 2102 fixed on the beam axis 718, the ribbon moving relative to the beam, and the substrate 404 moving relative to the payload. An alternative embodiment of the invention illustrated in FIG. 21B creates the transferred lines by moving the shaped aperture within a maximum field of view. More specifically, as shown in FIG. 21B, the embodiment includes a final lens 402 with field of view slightly larger than typical defect deposition repairs, for example, a maximum field of view (FOV) 2104 may be 150 micrometer by 150 micrometers. The variable aperture 2102, in this embodiment, does not stay centered relative to the beam center, but is stepped across the field of view 2104, thus sampling a different part of the field of view and therefore, a different part of the inked ribbon to create the needed line segments of the transferred line pattern. The ribbon, in this embodiment, is not stepped for each line segment, but is shifted in steps at least as large as the maximum FOV 2104. This embodiment may relax the requirements on the ribbon stage 722.

Figure 19A:
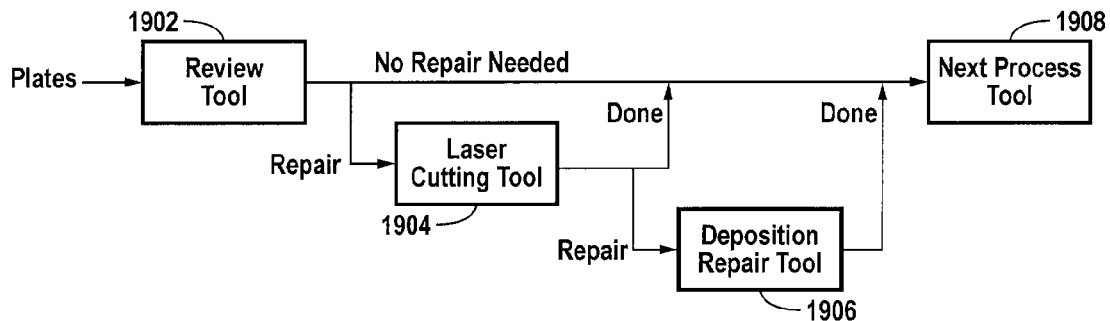
FIG. 19A is a block diagram showing flow of flat panel display plates through a sequence of a review tool, laser cutting repair tool, and deposition repair tool, as known in the prior art.
Figure 19B:
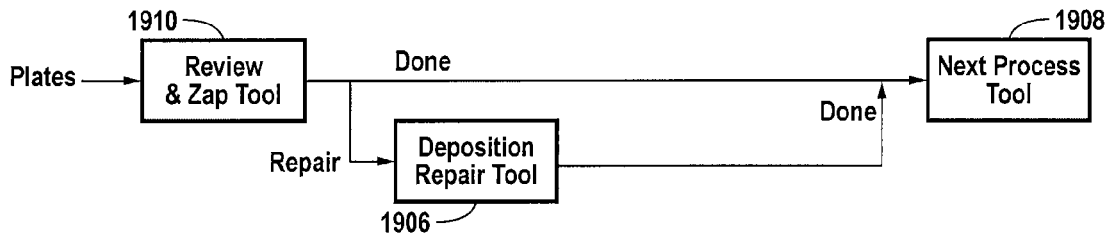
FIG. 19B is a block diagram showing flow of flat panel display plates through a sequence of a review/laser cutting repair tool and a deposition repair tool, as known in the prior art.
Figure 19C:
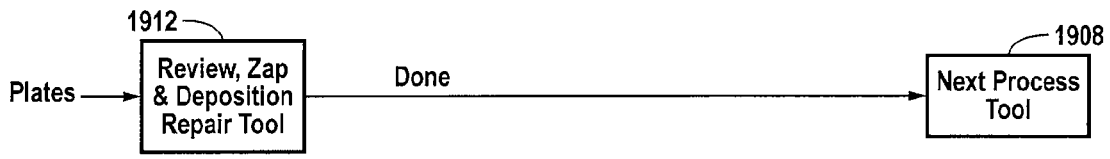
FIG. 19C is a block diagram showing flow of flat panel display plates through a single tool that includes integrated review, laser cutting repair, and deposition repair functions, in accordance with one embodiment of the present invention

As described above, in conventional production line arrangements, the review function is combined with the laser cutting (zap) function into a single tool, and the open defect repair is completed by a separate tool. Some production line arrangements use two separate tools for the review and laser cutting functions. Referring to FIGS. 19A, 19B and 19C, each box represents a distinct tool to which the plates flow.

Critical for any FPD production line is rate of flow of FP plates through production. Since plates are relatively large, 1.5 m to 2 m is typical, and thin, 1 mm typical, hand-off of plates between process and inspection tools must be performed carefully. Typical load/align/unload times within a review or repair tool is 45 seconds. Hence, the sequence in FIG. 19A, which uses three distinct tools, namely review tool 1902, laser cutting repair tool 1904, and open defect/deposition repair tool 1906, requires 3×45 sec=135 seconds of overhead handling time per plate. The sequence in FIG. 19B, which has two distinct tools, namely review and cutting repair tool 1910 and open defect/deposition repair tool 1906, requires 90 seconds. The sequence in FIG. 19C, in which all functions are combined within a single tool 1912, in accordance with the present invention requires only 45 seconds of handling time.

In accordance with the embodiment of the present invention shown in FIG. 19C, the review operations, the direct write repair operations and the cutting repair operations are performed by a single tool. The review operation provides the number, type, locations, size/degree of defects, which often vary from plate to plate. A means to pass judgment is required at almost all of the tool steps following capture of the defect images—for example, whether an image is truly a defect rather than nuisance, what kind of defect has been found, whether or not a specific defect needs repair, what kind of repair is required, what repair parameters are needed, what is the next defect to be repaired, and so forth. Some review/repair tools combine tool operation with human operator judgment and intervention to identify, classify, and then repair such defects. An embodiment of this invention incorporates the direct write or deposition repair defect identification, classification, deposition repair definitions, and execution into an Automatic Defect Repair (ADR) method and architecture within the review and cutting/deposition repair tool. An example of an ADR architecture and method is described in U.S. Application No. 60/646,111, assigned to Photon Dynamics, Inc., and incorporated herein by reference in its entirety. More specifically, for an embodiment of the invention combining review, cutting repair and deposition repair, such an ADR capability automatically (no human intervention) analyzes review and AOI/test data, and then identifies and classifies defects, and then sets up the repair parameters, and executes the repairs.

Referring to FIGS. 19A, 19B and 19C, the overhead handling times are only one factor in determining an optimized sequence of tools. Process times for each of the three potential steps also need to be considered. Typical review time per defect is the sum of time to move to the defect (approximately, 1 sec typically) and time to review the defect (approximately 0.5 sec). Repair by laser cutting is the sum of time to move to the defect (for example, 1 sec) and time to repair/cut (for example, approximately 4 seconds). Repair of open defects by way of deposition is the sum of time to move to the defect (for example, 1 sec) and time to write the repair. Deposition repairs using LCVD methods may take 60 seconds per repair, while repairs using dispensed ink including curing may take 10 seconds per repair. The percentage of reviewed defects requiring repair may vary from one user to another, plate-to-plate. The percentage of repairs requiring cutting versus those requiring material deposition may also vary.

Table 1 is an approximate breakdown of a number of exemplary defects and those requiring repair per plate. Estimates are normalized to 100. Included in the table are the estimated process times per defect.

TABLE 1

|  | Percent | Time per defect (sec) |
| --- | --- | --- |
| Total reviewed | 100 | 0.5 |
| Total repairs | 20 |  |
| Laser cut | 18 | 4 |
| LOR | 2 | 10 (invention) |
|  |  | 60 (LCVD) |

As an example, if there are 100 defects total, then total process time to complete review and repair, per the distribution shown in Table 1 is illustrated in Table 2.

TABLE 2

| Process Step | Time (sec) - Invention with review/cutting/dep repair | Time (sec) - review/cutting repair + LCVD (prior art) |
| --- | --- | --- |
| Handling | 45 | 2*45 = 90 |
| Review | 1.5*100 = 150 | 1.5*100 = 150 |
| Laser cutting | 5*18 = 90 | 5*18 = 90 |
| Deposition repair | 10*2 = 20 | 60*2 = 120 |
| Total | 305 | 450 |

The prior art LCVD deposition step adds approximately 100 seconds per plate and the requirement for transporting the plate from the review tool to the dedicated LCVD tool adds another 45 seconds. The present invention, which includes integrated deposition repair, review and cutting repair in one tool is shown as saving approximately 145 seconds over a two tool configuration, namely one having a first tool performing review/cutting operations and another performing LCVD deposition operations.

FPD production lines may include in-line equipment, in which individual plates flow from tool-to-tool, or they may make use of cassettes with multiple stacked plates, which are ported from tool-to-tool. Any of the flows illustrated in FIGS. 19A, 19B, 19C would suit an in-line production line, irrespective of the length of LOR process time. However, for the equipment that uses cassettes, there is always a likelihood, that an open defect will be found on at least one of the plates within the cassette. More typically, each plate within a cassette is likely to have at least one open defect. Then, the whole cassette must be "held up" for the deposition repair of these few defects. In either case, a short deposition repair process time is far more advantageous than a longer process time. Accordingly, a tool having integrated review/cutting repair/ and deposition repair, in accordance with the present invention, and as shown in FIG. 19C, provides a number of advantages over the tools shown in FIGS. 19A and 19B because a short deposition repair time is typically well below the handling time.

Referring to conventional systems shown in FIGS. 19A, 19B, all potential defects may be reviewed first, and then all defects requiring laser cutting may be repaired, followed by the repair of all open defects. Alternatively, all open defects could be repaired followed by all defects requiring laser cutting. Either case requires moving two times to a defect to be repaired, a first time to review, and a second time to repair the defect. Referring to FIG. 19C of the present invention, potential defects may be reviewed and immediately repaired (either laser cut or deposition). Therefore, in accordance with one embodiment of the present invention, a defect is located just once.

The above embodiments of the present invention are illustrative and not limiting. Various alternatives and equivalents are possible. Although, the invention has been described with reference to a flat panel array repair by way of an example, it is understood that the invention may be applied to other repair processes within FPD fabrication, such as color filter repair, or panel repair. Further, the invention may be used in direct writing applications requiring deposition, such as microelectronic circuit creation and repair, printing of circuits on flat panels and solar panels, or repair of solar panels, or creation of capacitors, batteries, semiconductor circuits, etc. Other additions, subtractions or modifications are obvious in view of the present disclosure and are intended to fall within the scope of the appended claims.

What is claimed is:

1. A method of performing an operation on a substrate, the method comprising:
    selectively positioning a first lens coaxially with an optical path of an imaging block to focus a camera disposed in the imaging block on a structure formed on the substrate to enable capturing of an image of the structure to review the structure;
    delivering a laser beam along the optical path to the structure;
    selectively positioning the first lens coaxially with the optical path if the reviewed structure is identified as requiring material removal;
    focusing the laser beam on the structure using the first lens so as to remove a material present in the structure;
    positioning a ribbon coated with a rheological compound in the path of the laser beam;
    selectively positioning a second lens coaxially with the optical path if the reviewed structure is identified as requiring material transfer;
    focusing the laser beam on the ribbon using the second lens so as to transfer the rheological compound to the structure;
    maintaining a distance between the substrate and the first lens within the predefined range during the material removal; and
    maintaining a distance between the ribbon and the second lens within the predefined range during the transfer of the rheological compound.

2. The method of claim 1 further comprising:
    capturing an image of the structure after removal of the material therefrom.

3. The method of claim 1 further comprising:
    capturing an image of the structure after deposition of the rheological compound on the substrate.

4. The method of claim 1 further comprising:
    maintaining a distance between the ribbon and the substrate within a predefined range as the ribbon is moved relative to the substrate.

5. The method of claim 1 further comprising:
    maintaining a variable shape aperture centered about the laser beam as the ribbon is move relative to the laser beam.

6. The method of claim 1 further comprising:
    varying a variable aperture about a center of the laser beam so as to step across a field of view of the second lens.

7. The method of claim 1 wherein said laser beam has a plurality of wavelengths concurrently present therein.

8. The method of claim 1 further comprising:
    selecting a wavelength of the laser beam.

9. The method of claim 1 further comprising:
    varying a pulse length of the laser beam.

10. The method of claim 1 further comprising:
    curing the rheological compound deposited on the substrate using the laser beam.

11. The method of claim 1 further comprising:
    heating the rheological compound deposited on the substrate.

12. The method of claim 11 further comprising:
    heating the rheological compound deposited on the substrate using a second laser beam.

13. The method of claim 1 wherein said substrate is a panel selected from a group consisting of flat panel display and solar panel.

14. The method of claim 1 wherein said deposited rheological compound provides an electrical connection between a pair of nodes.

15. The method of claim 1 wherein said ribbon comprises a first recessed well coated with the rheological compound, said first recessed well adapted to be positioned in the optical path of the laser beam, said ribbon being transparent to a wavelength of the laser beam.

16. The method of claim 15 wherein said ribbon further comprises a second recessed well coated with a second rheological compound, said second recessed well adapted to be positioned in the optical path of the laser beam.

17. The method of claim 1 further comprising:
    preparing the ribbon on-demand.

18. The method of claim 17 wherein said ribbon comprises a first recessed well coated with the rheological compound, said first recessed well adapted to be positioned in the optical path of the laser beam, said ribbon being transparent to a wavelength of the laser beam.

19. The method of claim 18 wherein said ribbon further comprises a second recessed well coated with a second rheological compound, said second recessed well adapted to be positioned in the optical path of the laser beam.

20. The method of claim 1 further comprising:
    moving a position of the first lens relative to the substrate and parallel in to the optical path; and
    moving a position of the ribbon relative to the second lens and in parallel to the optical path.

21. The method of claim 20 further comprising:
    parking the ribbon in a home position.

22. The method of claim 21 further comprising:
    covering the ribbon when parked in the home position.

23. The method of claim 22 further comprising:
    controlling a temperature of the covered ribbon.

24. The method of claim 21 further comprising:
    moving the ribbon to a load/unload position to enable changing of the ribbon.

25. The method of claim 20 further comprising:
rotate the ribbon relative to the second lens about an axis parallel to the optical path.

26. The method of claim 25 further comprising:
rotating the ribbon at a first angle to park the ribbon in a home position.

27. The method of claim 25 further comprising:
rotating the ribbon at a second angle to enable changing of the ribbon.

28. The method of claim 1 further comprising:
moving a relative position of the ribbon in a plane perpendicular to the optical path of the laser beam.

29. The method of claim 1 further comprising:
moving a relative position of the substrate in a plane perpendicular to the optical path of the laser beam.

* * * * *